United States Patent
Ramorini et al.

(10) Patent No.: US 9,461,504 B2
(45) Date of Patent: Oct. 4, 2016

(54) ENHANCED EFFICIENCY ENERGY-SCAVENGING INTERFACE, METHOD FOR OPERATING THE ENERGY-SCAVENGING INTERFACE, AND ENERGY-SCAVENGING SYSTEM COMPRISING THE ENERGY-SCAVENGING INTERFACE

(71) Applicant: STMicroelectronics S.r.l., Agrate Brianza (IT)

(72) Inventors: Stefano Ramorini, Arluno (IT); Alessandro Gasparini, Cusano Milanino (IT); Alberto Cattani, Cislago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 350 days.

(21) Appl. No.: 14/036,751

(22) Filed: Sep. 25, 2013

(65) Prior Publication Data

US 2014/0084876 A1    Mar. 27, 2014

(30) Foreign Application Priority Data

Sep. 27, 2012   (IT) .............. TO2012A0847

(51) Int. Cl.
| | |
|---|---|
| H02J 15/00 | (2006.01) |
| H02M 3/158 | (2006.01) |
| H02N 2/18 | (2006.01) |
| H02M 7/217 | (2006.01) |
| H02M 1/00 | (2006.01) |

(52) U.S. Cl.
CPC ............ *H02J 15/00* (2013.01); *H02M 3/1588* (2013.01); *H02N 2/181* (2013.01); *H02M 7/217* (2013.01); *H02M 2001/0009* (2013.01); *Y02B 70/1466* (2013.01)

(58) Field of Classification Search
CPC ....................................................... H02J 15/00
USPC .......................................................... 320/166
See application file for complete search history.

(56) References Cited

U.S. PATENT DOCUMENTS

| | | |
|---|---|---|
| 4,750,099 A | 6/1988 | Inoue et al. |
| 5,617,015 A | 4/1997 | Goder et al. |

(Continued)

FOREIGN PATENT DOCUMENTS

WO    WO-2007040536 A2    4/2007

OTHER PUBLICATIONS

IEEE Icro, IEEE Service Center, Los Alatimos, CA,US, vol. 21, No. 3, May 1, 2001.*
Italian Search Report and Written Opinion for TO2012A000847 mailed Jun. 17, 2013 (10 pages).

(Continued)

*Primary Examiner* — Samuel Berhanu
*Assistant Examiner* — Tessema Kebede
(74) *Attorney, Agent, or Firm* — Gardere Wynne Sewell LLP

(57) ABSTRACT

An energy-scavenging interface includes first and second switches connected in series between an input and reference, and third and fourth switches connected in series between the input and an output. A control circuit closes the first and second switches and opens the third switch for a first time interval to store charge in a storage element. A scaled copy of a peak value of the charging current is obtained. The control circuit then opens the first switch and closes the third and fourth switches to generate an output signal as long as the value in current of the output signal is higher than the value of said scaled copy of the peak value.

16 Claims, 15 Drawing Sheets

(56) References Cited

U.S. PATENT DOCUMENTS

| | | | |
|---|---|---|---|
| 5,923,154 | A | 7/1999 | Moller |
| 6,204,633 | B1 | 3/2001 | Kitagawa |
| 6,229,292 | B1 | 5/2001 | Redl et al. |
| 6,504,208 | B2 | 1/2003 | Bosco et al. |
| 6,995,496 | B1 | 2/2006 | Hagood, IV et al. |
| 7,105,982 | B1 | 9/2006 | Hagood, IV et al. |
| 7,132,765 | B2 | 11/2006 | Premont et al. |
| 7,193,401 | B1 | 3/2007 | Hasegawa |
| 7,466,112 | B2 | 12/2008 | Zhou et al. |
| 7,773,399 | B2 | 8/2010 | Nakamura et al. |
| 7,800,928 | B1 | 9/2010 | Dernovsek et al. |
| 7,915,871 | B2 * | 3/2011 | Wang .............. H02M 3/156 323/222 |
| RE43,291 | E | 4/2012 | Groom |
| 8,159,204 | B2 | 4/2012 | Grant |
| 2002/0158513 | A1 | 10/2002 | Amano et al. |
| 2004/0189267 | A1 | 9/2004 | Wecht |
| 2005/0007178 | A1 | 1/2005 | Fahim |
| 2005/0110277 | A1 | 5/2005 | Adamson et al. |
| 2005/0218877 | A1 | 10/2005 | Oswald et al. |
| 2006/0237968 | A1 * | 10/2006 | Chandrasekaran . H02M 7/2176 290/1 R |
| 2007/0159150 | A1 | 7/2007 | Hosokawa et al. |
| 2008/0129144 | A1 | 6/2008 | Bechhoefer |
| 2009/0284886 | A1 | 11/2009 | Matsumoto |
| 2009/0309566 | A1 * | 12/2009 | Shiu .................. H02M 3/07 323/283 |
| 2009/0322303 | A1 | 12/2009 | Hirata et al. |
| 2010/0084920 | A1 | 4/2010 | Banting et al. |
| 2010/0165686 | A1 * | 7/2010 | Matzberger ......... H02M 7/219 363/127 |
| 2010/0301122 | A1 | 12/2010 | Russell et al. |
| 2011/0096578 | A1 * | 4/2011 | Fang ............... H02M 3/33592 363/127 |
| 2011/0221416 | A1 | 9/2011 | Ivanov et al. |
| 2011/0285131 | A1 | 11/2011 | Kwon et al. |
| 2012/0169064 | A1 * | 7/2012 | Hoffman ............ B64D 41/00 290/1 R |
| 2012/0224398 | A1 | 9/2012 | Franco et al. |
| 2012/0235976 | A1 | 9/2012 | Van Lier |
| 2014/0232189 | A1 | 8/2014 | Gasparini et al. |

OTHER PUBLICATIONS

Dwari Suman, et al: "An Efficient AC-DC Step-Up Converter for Low-Voltage Energy Harvesting," IEEE Transactions on Power Electronics, vol. 25, No. 8, Aug. 2010 (pp. 2188-2199).

Cao Xinping et al: "Electromagnetic Energy Harvesting Circuit With Feedforward and Feedback DC-DC PWM Boost Converter for Vibration Power Generator System," IEEE Transactions on Power Electronics, vol. 22, No. 2, Mar. 2007 (pp. 679-685).

Hasan, A., et al.: "Monolithic DC-DC Boost Converter With Current-Mode Hysteretic Control," Electrical and Computer Engineering (CCECE), 2011 24th Canadian Conerence On, IEEE, May 8, 2011, pp. 1242-1245.

Salmon, J. C. ED—Institute of Electrical and Electronics Engineers: "Circuit Topologies for Single-Phase Voltage-Doubler Boost Rectifiers," IEEE, US, Feb. 23, 1992, pp. 549-556.

Shenck N. S., et al: "Energy Scavenging With Shoe-Mounted Piezoelectrics," IEEE Micro, IEEE Service Center, Los Alamitos, CA, US, vol. 21, No. 3, May 1, 2001 (9 pages).

Belloni M et al: "On the Design of Single-Inductor Multiple-Output DC-DC Buck Converters," Circuits and Systems, 2008, ISCAS 2008, IEEE International Symposium On, IEEE, Piscataway, NJ, US, May 18, 2008, pp. 3049-3052.

Ma D et al: "A Pseudo-CCM/DCM Simo Switching Converter With Freewheel Switching," IEEE Journal of Solid-State Circuits, IEEE Service Center, Piscataway, NJ, US, vol. 38, No. 6, Jun. 1, 2003, pp. 1007-1014.

Seeman M D et al: "An Ultra-Low-Power Power Management IC for Energy-Scavenged Wireless Sensor Nodes," Power Electronics Specialists Conference, 2008, PESC 2008, IEEE, Piscataway, NJ, US, Jun. 15, 2008, pp. 925-931.

Seeman M D et al: "An Ultra-Low-Power Power Management IC for Wireless Sensor Nodes," Custom Integrated Circuits Conference, 2007, CICC '07, IEEE, Piscataway, NJ, US, Sep. 16, 2007, pp. 567-570.

Wing-Hung Ki et al: "Single-Inductor Multiple-Output Switching Converters," 32nd Annual IEEE Power Electronics Specialists Conference, PESC 2001. Conference Proceedings, Vancouver, CA, Jun. 17-21, 2001, pp. 226-231.

Maxim Integrated Products: Maxim Dual Mode 5V/Programmable Micropower Voltage Regulators (MAX663/MAX664/MAX666) Spec Sheet; Rev 1; Jul. 1996; pp. 1-8.

* cited by examiner

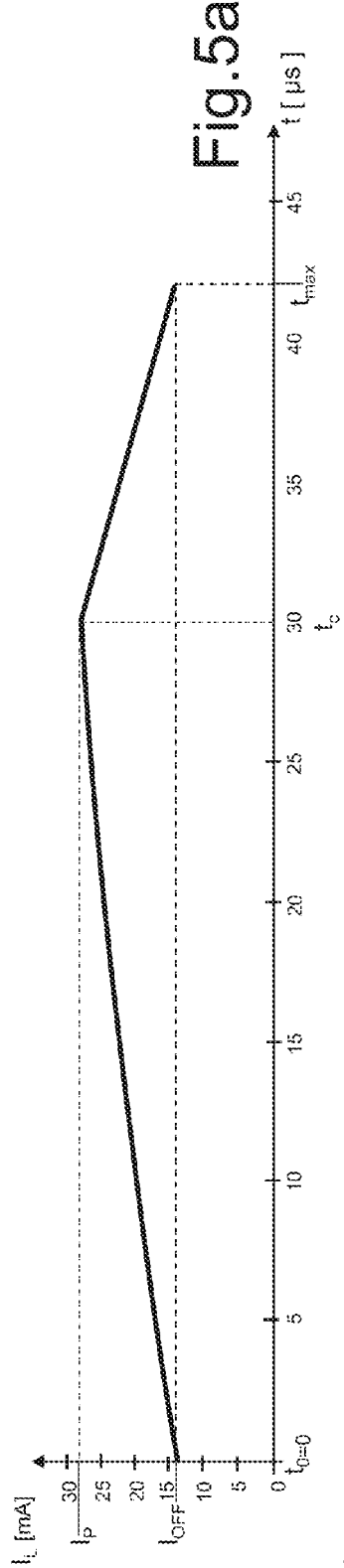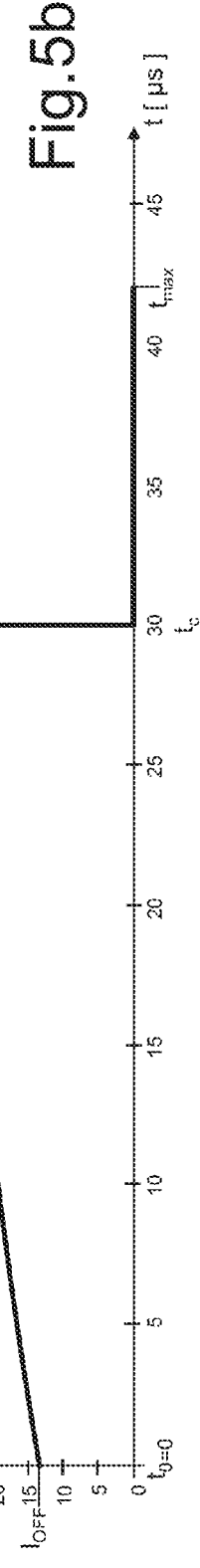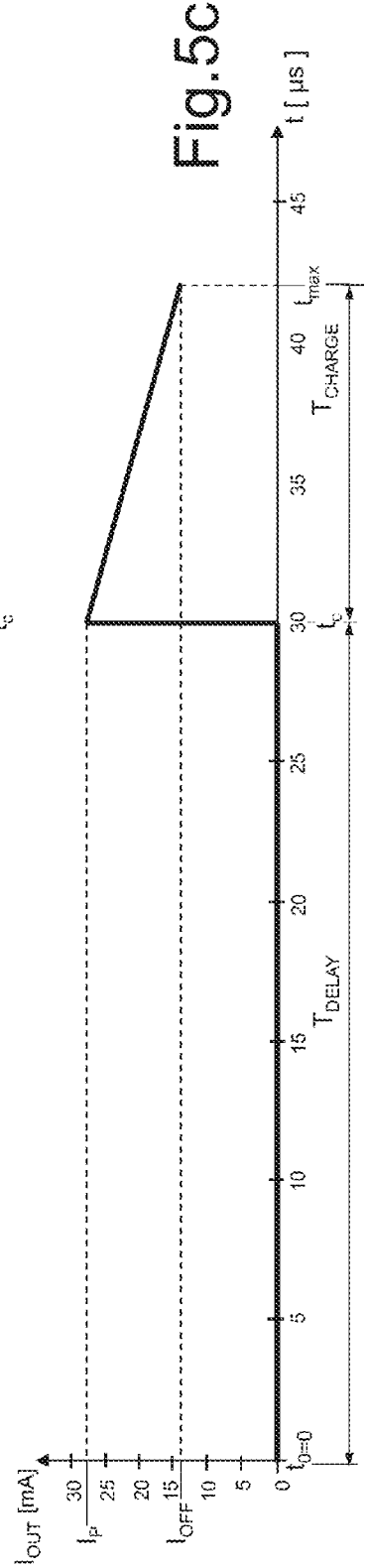

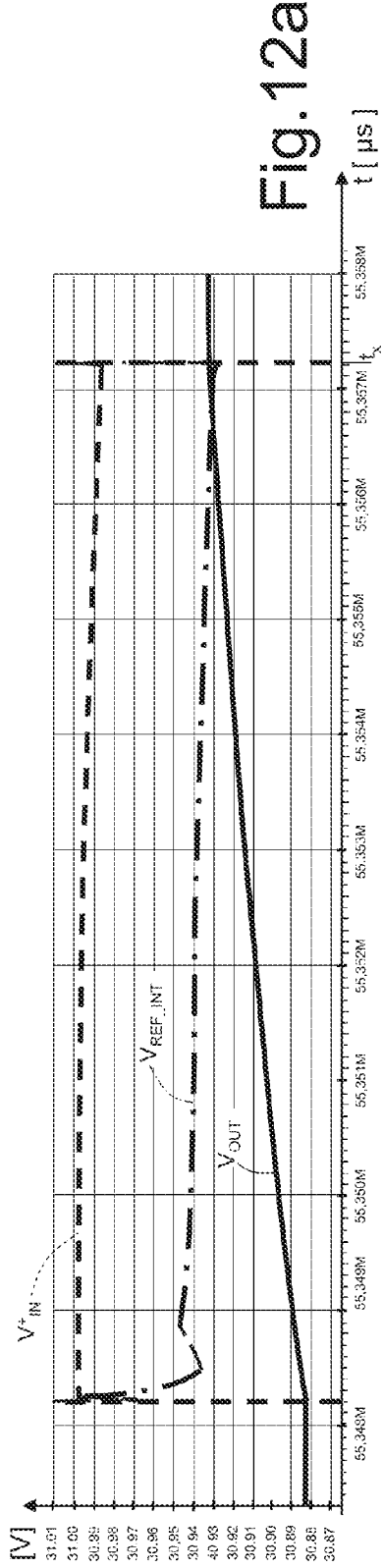
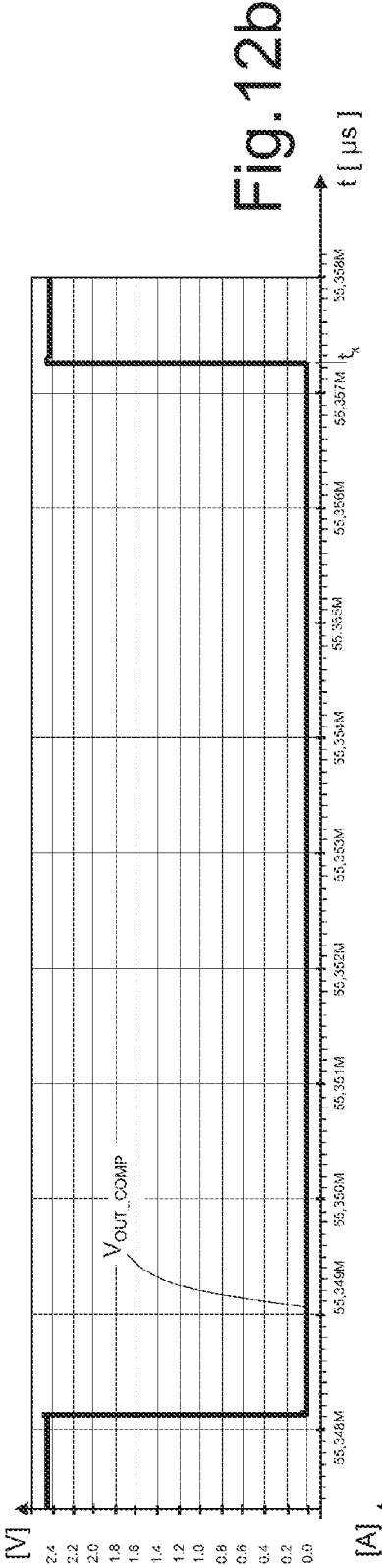
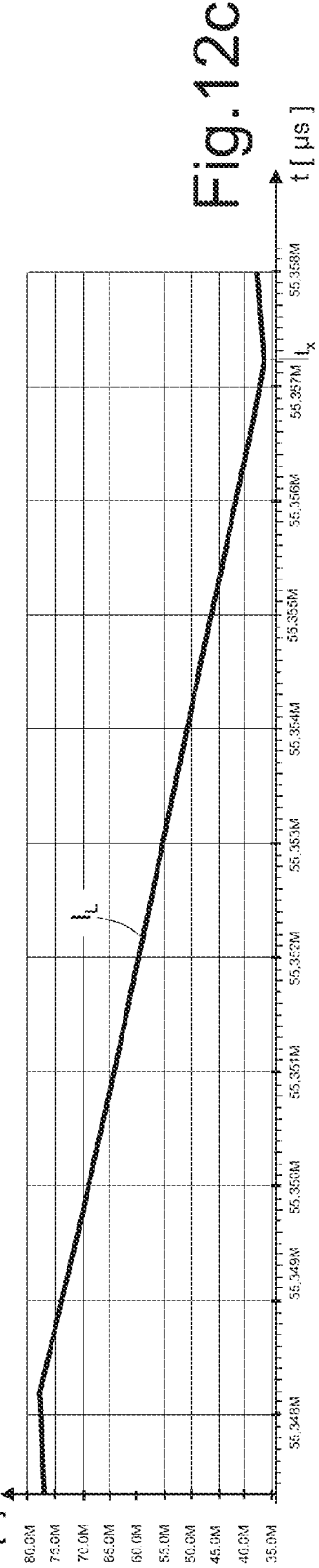

ENHANCED EFFICIENCY ENERGY-SCAVENGING INTERFACE, METHOD FOR OPERATING THE ENERGY-SCAVENGING INTERFACE, AND ENERGY-SCAVENGING SYSTEM COMPRISING THE ENERGY-SCAVENGING INTERFACE

PRIORITY CLAIM

This application claims priority from Italian Application for Patent No. TO2012A000847 filed Sep. 27, 2012, the disclosure of which is incorporated by reference.

TECHNICAL FIELD

The present invention relates to an enhanced-efficiency energy-scavenging interface, to a method for operating the energy-scavenging interface, and to an energy-scavenging system comprising the energy-scavenging interface. In particular the invention regards an energy-scavenging interface including a rectifier circuit. The present invention moreover regards an apparatus (for example, a vehicle or an item of footwear) comprising the energy-scavenging system.

BACKGROUND

As is known, systems for energy scavenging or energy harvesting from environmental energy sources have aroused and continue to arouse considerable interest in a wide range of fields of technology. Typically, energy-scavenging systems are designed to harvest, store, and transfer energy generated by mechanical sources to a generic load of an electrical type.

Low-frequency vibrations, such as, for example, mechanical vibrations of disturbance in systems with moving parts, may be a valid source of energy. The mechanical energy is converted, by one or more purposely provided transducers (for example, piezoelectric or electromagnetic devices) into electrical energy, which can be used for supplying an electrical load. In this way, the electrical load does not require batteries or other supply systems that are cumbersome and have a poor resistance to mechanical stresses.

FIG. 1 is a schematic illustration by means of functional blocks of an energy-scavenging system of a known type.

The energy-scavenging system 1 of FIG. 1 comprises: a transducer 2, for example of an electromagnetic or piezoelectric type, subject during use to environmental mechanical vibrations and configured for converting mechanical energy into electrical energy, typically into AC voltages; a scavenging interface 4, for example comprising a diode-bridge rectifier circuit (also known as Graetz bridge), configured for receiving at input the AC signal generated by the transducer 2 and for supplying at output a DC signal for charging a capacitor 5 connected on the output of the rectifier circuit 4; and a DC-DC converter 6, connected to the capacitor 5 to receive at input the electrical energy stored by the capacitor 5 and supply it to an electrical load 8. The capacitor 5 has hence the function of element for storage of energy, which is made available, when required, to the electrical load 8 for operation of the latter.

The global efficiency $\eta_{TOT}$ of the energy-scavenging system 1 is given by $$\eta_{TOT} = \eta_{TRANSD} \cdot \eta_{SCAV} \cdot \eta_{DCDC} \quad (1)$$

where: $\eta_{TRANSD}$ is the efficiency of the transducer 2, indicating the amount of energy available in the environment that is effectively converted, by the transducer 2, into electrical energy; $\eta_{SCAV}$ is the efficiency of the scavenging interface 4, indicating the energy consumed by the scavenging interface 4 and the factor $\eta_{COUPLE}$ of matching between the transducer 2 and the scavenging interface 4 (indicating the impedance matching between the transducer 2 and the scavenging interface 4); and $\eta_{DCDC}$ is the efficiency of the DC-DC converter 6.

As is known, in order to supply to the load the maximum power available, the impedance of the load should be the same as that of the source. As shown in FIG. 2, the transducer can be represented schematically, in this context, as a voltage generator 3 provided with a resistance $R_S$ of its own. The maximum power $P_{TRANSD}^{MAX}$ that the transducer 2 can supply at output can be defined as $$P_{TRANSD}^{MAX} = V_{TRANSD}^2 / 4R_S \text{ if } R_{LOAD} = R_S \quad (2)$$

where: $V_{TRANSD}$ is the voltage supplied by the equivalent voltage generator; and $R_{LOAD}$ is the equivalent electrical resistance on the output of the transducer 2 (or, likewise, the resistance seen at input to the scavenging interface 4), which takes into due account the equivalent resistance of the scavenging interface 4, of the DC-DC converter 6, and of the load 8.

On account of the impedance mismatch ($R_{LOAD} \neq R_S$), the power at input to the scavenging interface 4 is lower than the maximum power available $P_{TRANSD}^{MAX}$.

The power $P_{SCAV}$ is supplied at output by the scavenging interface 4 and is given by $$P_{SCAV} = \eta_{TRANSD} \cdot \eta_{SCAV} \cdot P_{TRANSD}^{MAX} \quad (3)$$

The power required of the DC-DC converter 6 for supplying the electrical load 8 is given by $$P_{LOAD} = P_{DCDC} \cdot \eta_{DCDC} \quad (4)$$

where $P_{DCDC}$ is the power received at input by the DC-DC converter 8, in this case coinciding with $P_{SCAV}$, and $P_{LOAD}$ is the power required by the electrical load.

The efficiency of the system 1 of FIG. 1 is markedly dependent upon the signal generated by the transducer 2. The efficiency drops rapidly to the zero value (i.e., the system is unable to harvest environmental energy) when the amplitude of the signal of the transducer (signal $V_{TRANSD}$) assumes a value lower, in absolute value, than $V_{OUT} + 2V_{TH\_D}$, where $V_{OUT}$ is the voltage stored on the capacitor 5, and $V_{TH\_D}$ is the threshold voltage of the diodes that form the scavenging interface 4. As a consequence of this, the maximum energy that can be stored in the capacitor 5 is limited to the value $E_{max} = 0.5 \cdot C_{OUT} \cdot (V_{TRANSD}^{MAX} - 2V_{TH\_D})^2$. If the amplitude of the signal $V_{TRANSD}$ of the transducer 2 is lower than twice the threshold voltage $V_{TH\_D}$ of the diodes of the rectifier of the scavenging interface 4 (i.e., $V_{TRANSD} < 2V_{TH\_D}$), then the efficiency of the system 1 is zero, the voltage stored on the output capacitor 5 is zero, the environmental energy is not harvested, and the electrical load 8 is not supplied.

SUMMARY

There is a need to provide an enhanced-efficiency energy-scavenging interface, a method for operating the energy-scavenging interface, an energy-scavenging system comprising the energy-scavenging interface, and an apparatus comprising the energy-scavenging system that will address the aforementioned problems and disadvantages, and in particular that will present a high efficiency.

The energy-scavenging interface (in particular, having the configuration of a rectifier circuit) according to the present invention can be connected between an input signal source (in particular, a variable voltage signal) and an electrical load (with the possible interposition of a DC-DC converter designed to supply to the electrical load a voltage signal having a level of voltage accepted by the electrical load). The energy-scavenging interface comprises, according to an embodiment, a first switch and a third switch, set in series, connected between the input terminal of the interface and an output terminal of the interface, which is set at constant voltage. The interface further comprises a second switch and a fourth switch, set in series, connected between the input terminal of the interface and the output terminal of the interface on which the energy is harvested. The energy-scavenging interface further comprises a control logic, coupled to the control terminals of the first and second switches, configured for opening/closing the first and second switches by means of an appropriate control signal.

The energy-scavenging interface moreover comprises a further third switch and fourth switch, each having a control terminal, and connected in series to the first and second switches, respectively.

Present on the output of the energy-scavenging interface is a capacitor for storing the power transferred at output of the scavenging interface. In parallel to the capacitor there may be present an electrical load, which is supplied by means of the energy stored in the capacitor. As has already been said, between the capacitor and the electrical load there can be set a DC-DC converter, of a buck, boost, or buck/boost type.

In a first operating condition, the first and third switches are closed, and the energy-scavenging interface stores electrical energy in a storage element coupled to the first and third switches; the second switch is, instead, open so that the capacitor is not charged.

In a second operating condition, the storage element is electrically coupled to the capacitor by opening the first switch and closing the second switch. The capacitor is charged by means of the electrical energy previously stored in the first operating condition.

Passage from the first operating condition to the second operating condition, and vice versa, is cyclic.

The energy-scavenging interface according to the present invention is described in detail with reference to a preferred application thereof, in particular as rectifier circuit of an energy-scavenging system set between a voltage source and a storage element and/or electrical load.

According to one aspect of the present invention, the energy-scavenging interface further comprises a current-measuring and generating device coupled to conduction terminals of the third switch for detecting the current that flows, in use, through the third switch (and, consequently, also through the first switch). The current-measuring and generating device is moreover configured for generating a scaled copy of the current that flows through the third switch. In particular generation of the scaled copy of the current is obtained by driving a further switch with a shape factor W/L reduced by an amount F with respect to the shape factor W/L of the third switch. The current that flows in said switch with shape factor W/L scaled by the amount F is hence F times less than the current that flows in the first and third transistors in the first operating condition.

BRIEF DESCRIPTION OF THE DRAWINGS

For a better understanding of the present invention, preferred embodiments thereof are now described, purely by way of non-limiting example and with reference to the attached drawings, wherein:

FIGS. 5a-5c show, using one and the same time scale, the time plot of current signals of the energy-scavenging system of FIG. 3a or FIG. 3b in the operating conditions of FIGS. 4a and 4b;

FIGS. 12a to 12c show, using one and the same time scale, the time plot of current signals in the circuit of FIG. 11;

DETAILED DESCRIPTION OF THE DRAWINGS

Figure 3A:
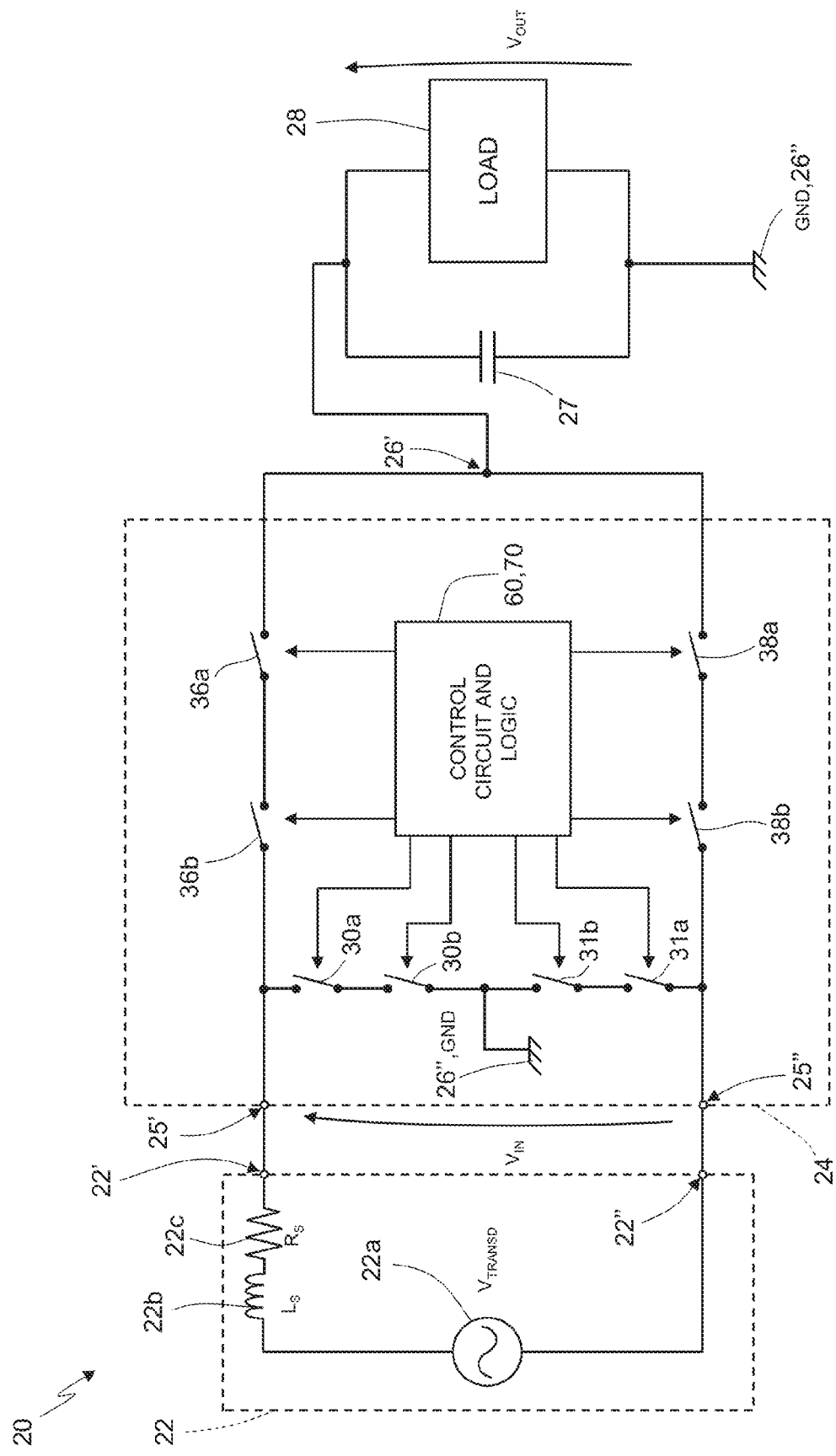
FIGS. 3a and 3b show an energy-scavenging system comprising a scavenging-interface circuit that can be operated according to the steps of the method of FIG. 13.

FIG. 3a shows an energy-scavenging system 20 comprising a rectifier circuit 24.

In general, the energy-scavenging system 20 comprises: a transducer 22 (similar to the transducer 2 of FIG. 1) including output terminals 22', 22" of its own; the rectifier circuit 24, including a first input terminal 25' and a second input terminal 25", which are electrically coupled, respectively, to the output terminals 22', 22" of the transducer 22, and a first output terminal 26' and a second output terminal 26"; and a storage element 27, for example a capacitor, connected between the first and second output terminals 26', 26" of the rectifier circuit 24, and configured for storing electric charge supplied at output from the rectifier circuit 24. The second output terminal 26" is, according to an embodiment, a terminal at reference voltage, for example at ground voltage GND, for instance, approximately 0 V. Other reference voltages may be used.

The transducer 22 is, for example, an electromagnetic transducer, and is represented schematically so as to include a voltage generator 22a, designed to supply a voltage $V_{TRANSD}$, an inductor 22b (typical of the electromagnetic transducer) having an inductance $L_S$, and a resistor 22c having a resistance $R_S$ and connected in series to the inductor 22b.

On the output of the rectifier circuit 24, in parallel to the storage element 27, there may be connected an electrical load 28, designed to be supplied by the charge stored in the storage element 27 or via a converter, for example, a DC-DC converter (not illustrated in the figure) if the electrical load requires a voltage value different from the one generated at output by the rectifier circuit 24.

Connected in series with respect to one another between the first input terminal 25' and the second output terminal 26" of the rectifier circuit 24 are a high-voltage (HV) switch 30a and a low-voltage (LV) switch 30b, in particular of a voltage-controlled type. The switches 30a and 30b are, for example, n-channel field-effect transistors (FETs).

The HV switch 30a is a device that is able to withstand high voltages. According to an embodiment, the HV switch 30a is a DMOS transistor that is able to operate with gate-to-drain voltages ($V_{GD}$) and drain-to-source voltages ($V_{DS}$) in the 30-50 V range, for example 40V.

The LV switch 30b is a low-voltage device. According to an embodiment, the LV switch 30b is a CMOS transistor that is able to operate with gate-to-source voltages ($V_{GS}$) in the 1-5 V range, in particular 2.5-3.6 V, for example 3.3 V. Other technologies for low-voltage transistors envisage slightly higher operating voltages, for example in the region of 4-5 V.

In general, given a maximum tolerated voltage value ($V_{max\_th}$) at the first output terminal 26' (depending, for example, upon the characteristics of the capacitor 27 and/or of the load 28), by "high voltages" is understood gate-to-drain voltages ($V_{GD}$) and drain-to-source voltages ($V_{DS}$) of the respective transistor close to, but not higher than, said maximum tolerated voltage value ($V_{max\_th}$). By "low voltages" is, instead, understood gate-to-source voltages $V_{GS}$ of the respective transistor.

It is evident that the values appearing above apply to a possible embodiment, and vary in relation to the technology used for the transistors and to the specific application.

Connected in series with respect to one another between the first input terminal 25' and the first output terminal 26' are a low-voltage (LV) switch 36b and a high-voltage (HV) switch 36a, in particular of a voltage-controlled type. Also the switches 36b and 36a are, for example, n-channel FETs. In particular, the HV switch 36a is of the same type as the HV switch 30a, that is able to withstand high voltages, whereas the LV switch 36b is of the same type as the LV switch 30b, for low voltages. The HV switch 36a has the function of guaranteeing high voltages on the output terminal 26" of the rectifier circuit 24.

Moreover, the rectifier circuit 24 further comprises: a high-voltage (HV) switch 31a and a low-voltage (LV) switch 31b, which are connected in series together and are electrically coupled between the second input terminal 25" and the second output terminal 26" of the rectifier circuit 24; and a high-voltage (HV) switch 38a and a low-voltage (LV) switch 38b, connected in series together and connected between the second input terminal 25" and the first output terminal 26'.

The switches 31a and 31b are similar (and specular from a circuit standpoint) to the switches 30a and 30b, and such that the HV switch 31a is a device that is able to withstand high gate-to-drain and drain-to-source voltages (for example, 30-50 V, in particular 40 V), whereas the LV switch 31b is a low-voltage device, for example a CMOS, that is able to withstand low gate-to-source voltages (for example, 1-5 V, in particular 2.5-3.6 V, still more in particular 3.3 V). Other technologies for low-voltage transistors envisage slightly higher operating voltages, for example in the region of 4-5V.

The switches 38a and 38b are similar (and specular from a circuit standpoint) to the switches 36a and 36b, respectively, and such that the HV switch 38a is a device that is able to withstand high voltages, whereas the LV switch 38b is a low-voltage device, in a way similar to what has already been described with reference to the switches 36a and 36b, respectively.

For simplicity of description the high-voltage (HV) switches 30a, 36a, 31a, 38a will be referred to as in what follows, respectively, as high-voltage (HV) transistors 30a, 36a, 31a, 38a without this implying any loss of generality, and the low-voltage (LV) switches 30b, 36b, 31b, 38b will be referred to as in what follows, respectively, as low-voltage (LV) transistors 30b, 36b, 31b, 38b, without this implying any loss of generality.

Likewise, by "transistor closed" will be meant in what follows a transistor biased in such a way as to enable conduction of electric current between its source and drain terminals, i.e., configured for behaving as a closed switch, and by "transistor open" will be meant in what follows a transistor biased in such a way as not to enable conduction of electric current between its source and drain terminals, i.e., configured for behaving as an open or inhibited switch.

Figure 3B:
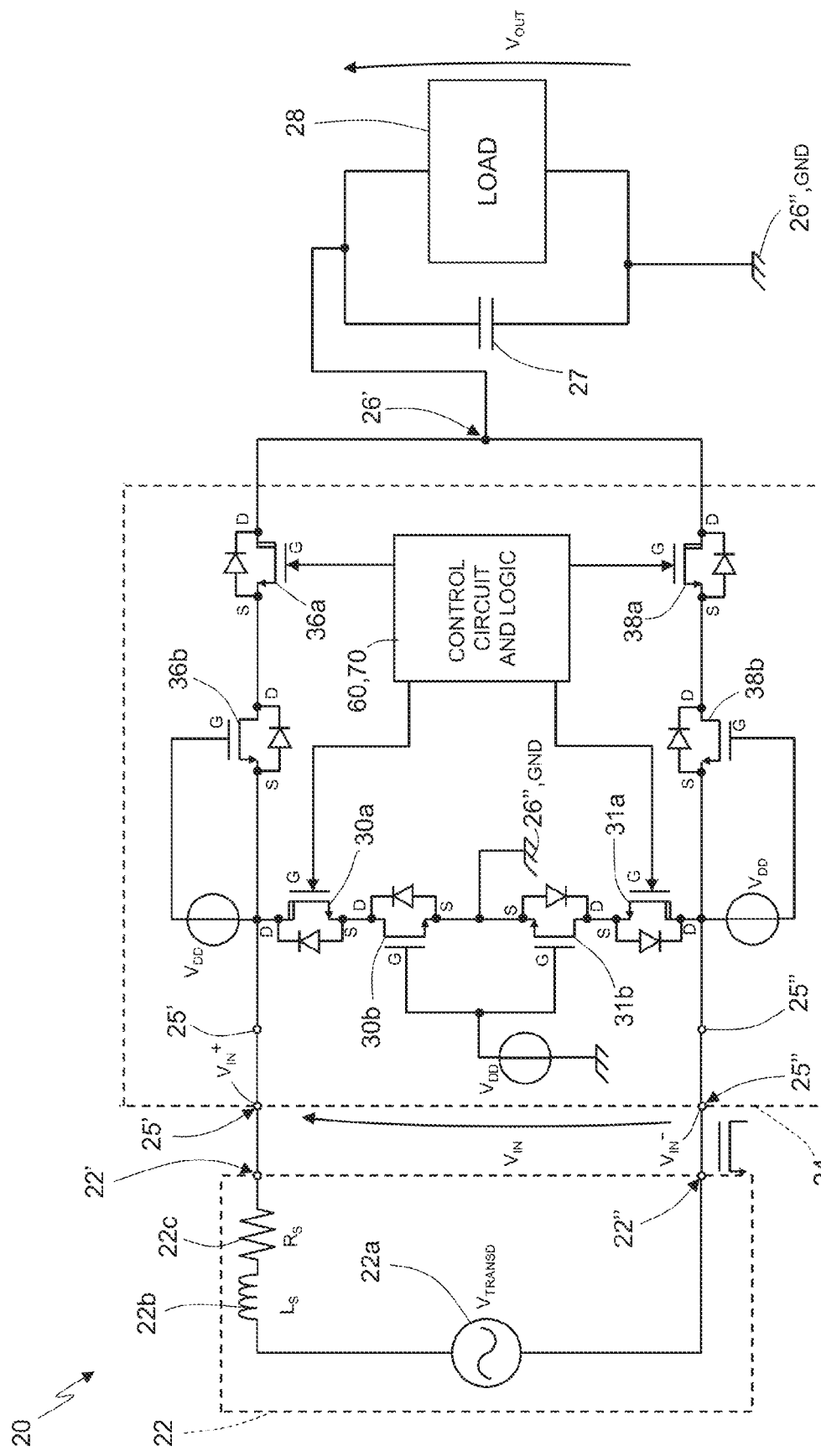

FIG. 3b shows the energy-scavenging system 20 of FIG. 3a in which the switches have been replaced by respective transistors. Each transistor is moreover represented with its own internal diode (parasitic diode).

With reference to FIG. 3b, the drain terminal D of the HV transistor 30a is connected to the first input terminal 25' of the rectifier circuit 24, while the source terminal S of the HV transistor 30a is connected to the drain terminal D of the LV transistor 30b; the source terminal S of the LV transistor 30b is, instead, connected to the second output terminal 26" of the rectifier circuit 24. In this way, the transistors 30a and 30b are effectively connected in series together between the input 25' and the output 26" of the rectifier circuit 24.

The drain terminal D of the HV transistor 36a is connected to the first output terminal 26' of the rectifier circuit 24, and the source terminal S of the HV transistor 36a is connected to the drain terminal D of the LV transistor 36b; the source terminal S of the LV transistor is connected to the first input terminal 25' of the rectifier circuit 24. In this way, the HV transistor 36a and the LV transistor 36b are effectively connected in series together between the input 25' and the output 26' of the rectifier circuit 24.

As regards the HV transistor 31a and the LV transistor 31b, these are connected between the second input terminal 25" and the second output terminal 26" of the rectifier circuit 24 so that the source terminal S of the LV transistor 31b is connected to the second output terminal 26", the drain terminal D of the HV transistor 31a is connected to the second input terminal 25", and the remaining drain terminal D of the LV transistor 31b and source terminal S of the HV transistor 31a are connected together.

The HV transistor 38a and the LV transistor 38b are connected between the second input terminal 25" and the first output terminal 26' in such a way that the source terminal S of the LV transistor 38b is connected to the second input terminal 25", the drain terminal D of the HV transistor 38a is connected to the first output terminal 26', and the remaining drain terminal D of the LV transistor 38b and source terminal S of the HV transistor 38a are connected together.

During positive half-cycles of the input voltage $V_{IN}$, the voltage rectification is carried out by driving appropriately the HV transistors 30a and 36a, keeping the LV transistors 30b and 36b in the closed state. In this step, the transistors 31a, 31b, and 38b are in a closed state, whereas the transistor 38a is in an open state. Conversely, during negative half-cycles of the input voltage $V_{IN}$, the voltage rectification is carried out by driving appropriately the HV transistors 31a and 38a, keeping the LV transistors 31b and 38b in the closed state. In this step, the transistors 30a, 30b, and 36b are kept in a closed open state, whereas the transistor 36a is open.

To operate the rectifier circuit 24, according to one embodiment, the rectifier circuit 24 further comprises a control circuit and a control logic, designated in FIG. 3a or FIG. 3b by the reference numbers 60 and 70, and described in greater detail with reference to FIGS. 8 and 9. Moreover, the control logic 60 implements the steps of the method of FIG. 13.

Figure 4A:
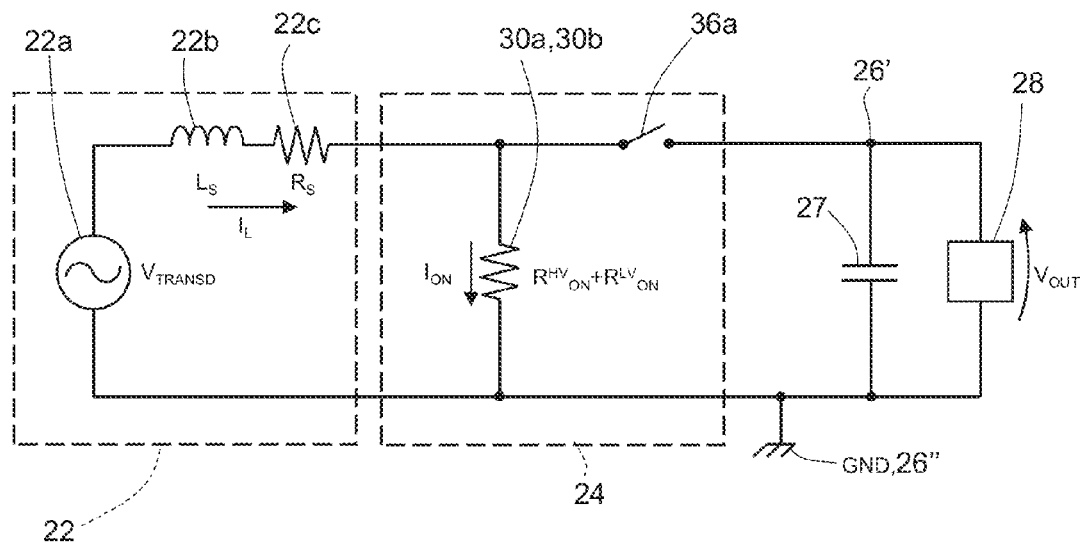
FIGS. 4a and 4b show the energy-scavenging system of FIG. 3a or 3b in respective operating conditions that follow one another in time.

In use, for example for positive voltages of $V_{IN}$, the HV transistor 30a and the LV transistor 30b are kept closed for at least a time interval $T_{DELAY}$ so as to store energy in the inductor 22b (situation shown schematically in FIG. 4a). During this step, for guaranteeing storage of the energy in the inductor 22b in the absence of transfer of energy on the capacitor 27, at least one between the transistors 36a and 36b (for example, just the HV transistor 36a) is kept in an open state (according to one embodiment, the transistor 36b is always kept in the closed state). The transistor 31a is controlled in the closed state, the transistor 31b is kept in the closed state, and the transistor 38a is controlled in the open state.

Then, once the time interval has elapsed $T_{DELAY}$ and once a minimum threshold value $I_{TH}$ has been reached for the energy stored in the inductor 22b, at least one between the transistors 30a and 30b (for example, just the HV transistor 30a) is opened, and the transistors 36a and 36b are closed so as to transfer the energy stored in the inductor 22b to the capacitor 27/load 28. This situation is shown schematically in FIG. 4b.

The input signal $V_{IN}$ is, as has been said, a variable signal, i.e., a signal having a time-variable polarity. For negative polarities of $V_{IN}$, what has been described with reference to FIGS. 4a and 4b in any case applies by controlling the transistors 31a, 31b, 38a and 38b in a similar way. The steps for control of these transistors are not described herein for reasons of brevity, but they will be apparent to any person skilled in the sector, on the basis of what has been described so far.

Figure 4B:
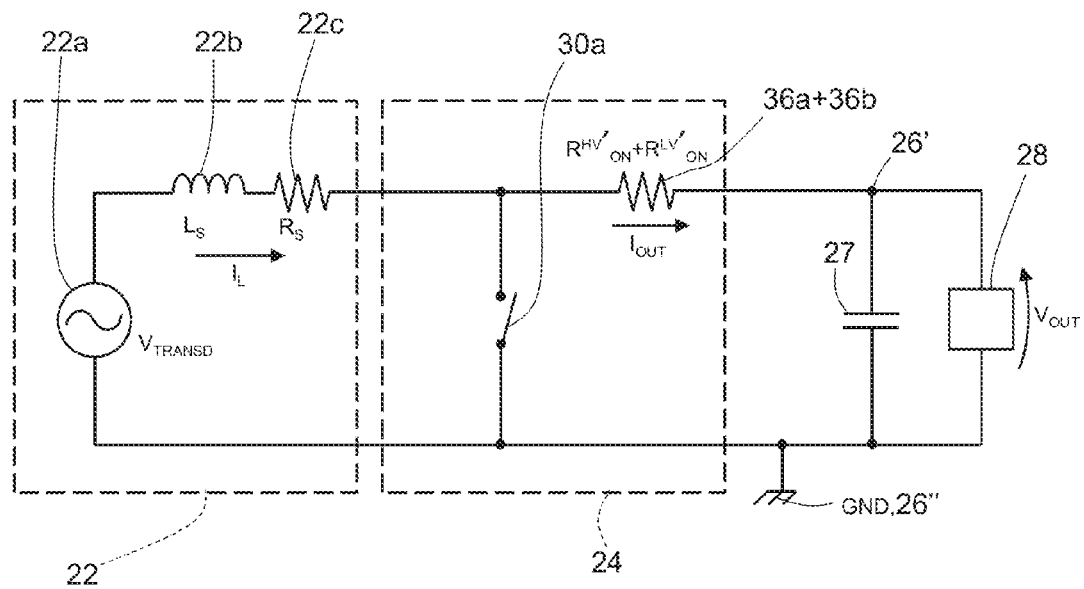

According to an embodiment, in both of the operating conditions of FIGS. 4a and 4b, for positive polarities of the input voltage $V_{IN}$, the LV transistors 30b and 36b are always kept closed, and the control logic 60 drives in an open/closed state just the HV transistors 30a and 36a. Likewise, for negative polarities of the input voltage $V_{IN}$, the control logic 60 drives in an open/closed state just the HV transistors 31a and 38a, whereas the LV transistors 31b and 38b are always kept closed.

This situation is represented schematically in FIG. 3b by showing voltage generators, designed to generate a voltage $V_{DD}$, coupled to the control terminals G of the LV transistors 30b, 31b, 36b, and 38b. The voltage $V_{DD}$ has a value such as to drive into the closed state the LV transistors 30b, 31b, 36b, and 38b.

It is evident that, according to a different embodiment, the control logic 60 can drive actively into an open/closed state both of the transistors 36a and 36b, and both of the transistors 38a and 38b, without thereby interfering with the steps of charging of the inductor 22b and supply of the capacitor 27/load 28 described previously.

During the step of FIG. 4b, in which the current stored in the inductor 22b is transferred at output on the storage element 27 by means of the transistors 36a and 36b (or alternatively the transistors 38a and 38b, according to the polarity of the input voltage $V_{IN}$), an increase in the output voltage $V_{OUT}$ is observed.

In what follows, operation of the rectifier 24 is described more fully with reference to a circuit model valid for a polarity (in particular the positive polarity) of the input signal $V_{IN}$, for greater simplicity and clarity of description. As has been said, what has been described may in any case be immediately applied to control of the transistors 31a, 31b, 38a, 38b in the case of negative polarity of the input signal $V_{IN}$.

FIG. 4a shows a circuit equivalent to the circuit of FIG. 3a or FIG. 3b, for positive half-waves of the input voltage $V_{IN}$. The HV transistor 36a is open and the LV transistor 36b is closed. The transistors 30a and 30b are closed. In this operating condition, the transistors 30a and 30b are ideally replaced by respective resistors which have an on-state resistance $R^{HV}_{ON}$ and $R^{LV}_{ON}$, respectively.

The current $I_L$ that flows in the inductor 22b is equal to the current $I_{ON}$ that traverses the transistors 30a and 30b in the on state. The value of the current $I_L$ increases up to a maximum value, or peak value, $I_P$ (see the graph of FIG. 5a).

The curve of $I_L$ has a time evolution given by $$I_L = I_{ON} = \frac{V_{TRANSD}}{R_S}\left(1 - e^{-\frac{t}{\tau}}\right) - I_{OFF} \cdot e^{-\frac{t}{\tau}}$$

and the current $I_{ON}$ reaches the peak value $I_p$ at time $t=t_c=T_{DELAY}$. For simplicity, it is assumed that the starting instant $t_0$ is 0 μs.

Once the time interval $T_{DELAY}$ has elapsed, and since the current $I_L$ that flows in the inductor 22b has reached a value equal to, or higher than, the threshold value $I_{TH}$, there is a passage to the operating condition represented schematically in FIG. 4b.

The time interval $T_{DELAY}$ is the interval elapsing between the instant of closing of the HV transistor 30a (at time $t_0$) and the instant of opening of the HV transistor 30a and closing of the transistor 36a (at time $t_c$). It is evident that, prior to closing of the HV transistor 36a it is expedient to open the HV transistor 30a so as to prevent phenomena of cross conduction and dissipation of power from the output capacitor 27 to ground GND.

The value of threshold current $I_{TH}$ is chosen on the basis of the peak values of current $I_p$ that are reached, and/or on the basis of the application of the rectifier circuit 24. These values depend upon the characteristics of the transducer 22 and upon the environmental stresses to which the transducer 22 is subject. In particular, the value of threshold current $I_{TH}$ is chosen much lower than the peak value $I_p$ that is expected to be reached in the application in which the rectifier circuit 24 is used. For example, assuming that peak values $I_p$ are reached of approximately 150 mA, the threshold $I_{TH}$ can be chosen as comprised between approximately 5 and 10 mA. It is pointed out that the choice of a threshold current $I_{TH}$ too close to the peak value $I_p$ entails a low efficiency. In fact, according to what has been described, current is transferred at output only when the threshold $I_{TH}$ is exceeded. All the portions of signal $V_{TRANSD}$ that generate a current with peak value $I_p<I_{TH}$ do not give contribution of charge transferred at output.

With reference to FIG. 4b, at time $t_c$, the HV transistor 30a is opened, and the HV transistor 36a is closed (as has been said, preferably respecting an guard interval to prevent cross conduction); the current $I_L$ that flows from the inductor 22b to the output 26' of the rectifier 24 is the current $I_{OUT}$ that charges the capacitor 27. In this step, the current in the inductor 22b decreases with a constant slope until it reaches the pre-defined value $I_{OFF}$ (at time $t_{max}$, see again FIG. 5a), according to the relation:

$$\frac{dI_L}{dt} = \frac{V_{OUT} + (R_S + R_{ON}^{\prime HV} + R_{ON}^{\prime LV}) \cdot \frac{I_P + I_{OFF}}{2} - V_{TRANSD}}{L_S}$$

where $R_{ON}^{\prime HV}$ and $R_{ON}^{\prime LV}$ are, respectively, the values of on-state resistance of the transistors 36a and 36b.

Since $I_{OFF}$ is a constant value, given by $I_p/K$, with K constant greater than 1 (chosen as explained hereinafter), we obtain the following formula for the peak value $I_p$:

$$I_P = \frac{V_{TRANSD}}{R_1 + R_S} \cdot \frac{\left(1 - e^{-\frac{T_{DELAY}}{\tau}}\right)}{1 - \frac{1}{K}e^{-\frac{T_{DELAY}}{\tau}}}$$

FIG. 5a shows the plot of the current $I_L$ in time t (μs). The curve of the current $I_L$ reaches the peak value $I_p$ at the instant $t_c$, when the HV transistor 30a is opened (see FIG. 5b) and the HV transistor 36a is closed.

Then, between $t_c$ and $t_{max}$ (time interval $T_{CHARGE}$) the current $I_L$ decreases until it reaches the value $I_{OFF}=I_p/K$.

FIG. 5b shows, using the same time scale as that of FIG. 5a, the plot of the current $I_{ON}$ that flows through the HV transistor 30a during the step of FIG. 4a of charging of the inductor 22b. In the time interval $t_0$-$t_c$ the current $I_{ON}$ presents the same evolution as the current $I_L$; at the instant $t_c$, the HV transistor 30a is opened and, consequently, the current $I_{ON}$ drops to zero.

FIG. 5c shows, using the same time scale as that of FIGS. 5a and 5b, the plot of the output current $I_{OUT}$. The current $I_{OUT}$ remains at a zero value in the time interval $t_0$-$t_c$, and then reaches the peak value $I_p$ at the instant $t_c$, when the capacitor 27 is electrically coupled to the inductor 22b. Then, between $t_c$ and $t_{max}$ (within the time interval $T_{CHARGE}$), the energy stored in the inductor 22b supplies and charges the capacitor 27.

The time interval $T_{CHARGE}$ is given by:

$$T_{CHARGE} = L_S \cdot \frac{I_P - I_{OFF}}{V_{OUT} + (R_S + R_{ON}^{\prime HV} + R_{ON}^{\prime LV}) \cdot \frac{I_P + I_{OFF}}{2} - V_{TRANSD}}$$

At time $t_{max}$, when the current that flows towards the capacitor 27 reaches the threshold value $I_{OFF}$, the HV transistor 36a is opened, and the HV transistor 30a is closed so that the inductor 22b is charged once again, as has already been described. The steps of charging and discharging of the inductor 22b (and, consequently, of supply of the capacitor 27/load 28) are repeated cyclically.

The integral of the curve of $I_{OUT}$ (FIG. 5c) between the time $t_c$ and the time $t_{max}$ indicates the charge $Q_{CYCLE}$ transferred between the input and the output of the rectifier 24 in the time $T_{CHARGE}$. In order to maximize the efficiency of transfer of charge between the input and the output of the rectifier 24, the value of the power $P_{CYCLE}$ transferred at output in each cycle of charge/discharge of the inductor 22b should be maximized. The power $P_{CYCLE}$ is defined as $P_{CYCLE}=V_{OUT} \cdot I_{CYCLE}$, where $I_{CYCLE}$ is given by $I_{CYCLE}=Q_{CYCLE}/T_{CYCLE}$, where $T_{CYCLE}$ is the time interval elapsing between $t_0$ and $t_{max}$ ($T_{CYCLE}=T_{DELAY}+T_{CHARGE}$).

It is known that $P_{CYCLE}$ is given by the following relation (where $I_{ON}$ assumes the peak value $I_p$)

$$P_{CYCLE} = \frac{\frac{I_{ON} + I_{OFF}}{2} \cdot T_{CHARGE}}{T_{DELAY} + T_{CHARGE}} \cdot V_{OUT}$$

From the foregoing relation it may be noted how the power $P_{CYCLE}$ is a function of the design parameters $T_{DELAY}$ and K, and of the external variables $V_{TRANSD}$ (voltage of the transducer, which is not predictable) and $V_{OUT}$ (voltage on the capacitor 27, which is not predictable either). Maximizing the value of $P_{CYCLE}$ hence means finding the optimal values of $T_{DELAY}$ and K in such a way that the curve of $P_{CYCLE}$ reaches a maximum value, or a value close to the maximum value, or an optimal value that can be defined according to the particular application and design requirements.

The curve of $P_{CYCLE}$ reaches an optimal value when the output of the transducer 22 and the input of the rectifier circuit 24 show the same impedance (namely, they are matched). The best matching efficiency $\eta_{COUPLE}$ between the transducer 22 and the rectifier circuit 24 is given by $P_{CYCLE}^{OPT}/P_{TRANSD}^{MAX}$, where $P_{CYCLE}^{OPT}$ is the value of $P_{CYCLE}$ calculated with optimal values of $T_{DELAY}$ and K, and $P_{TRANSD}^{MAX}$ is given by $(V_{TRANSD})^2/4R_S$.

Optimization of the value of $P_{CYCLE}$ enables an optimal value of the time interval $T_{DELAY}$ and of the factor K to be obtained (and vice versa) as a function of the value of $V_{TRANSD}$ and $V_{OUT}$. However, the present applicant has verified that the dependence of $T_{DELAY}$ upon $V_{TRANSD}$ and $V_{OUT}$ is irrelevant for practical purposes, and the value of matching efficiency $\eta_{COUPLE}$ reaches values higher than 95% for values of $V_{TRANSD}$ and $V_{OUT}$ of practical interest.

Figure 6:
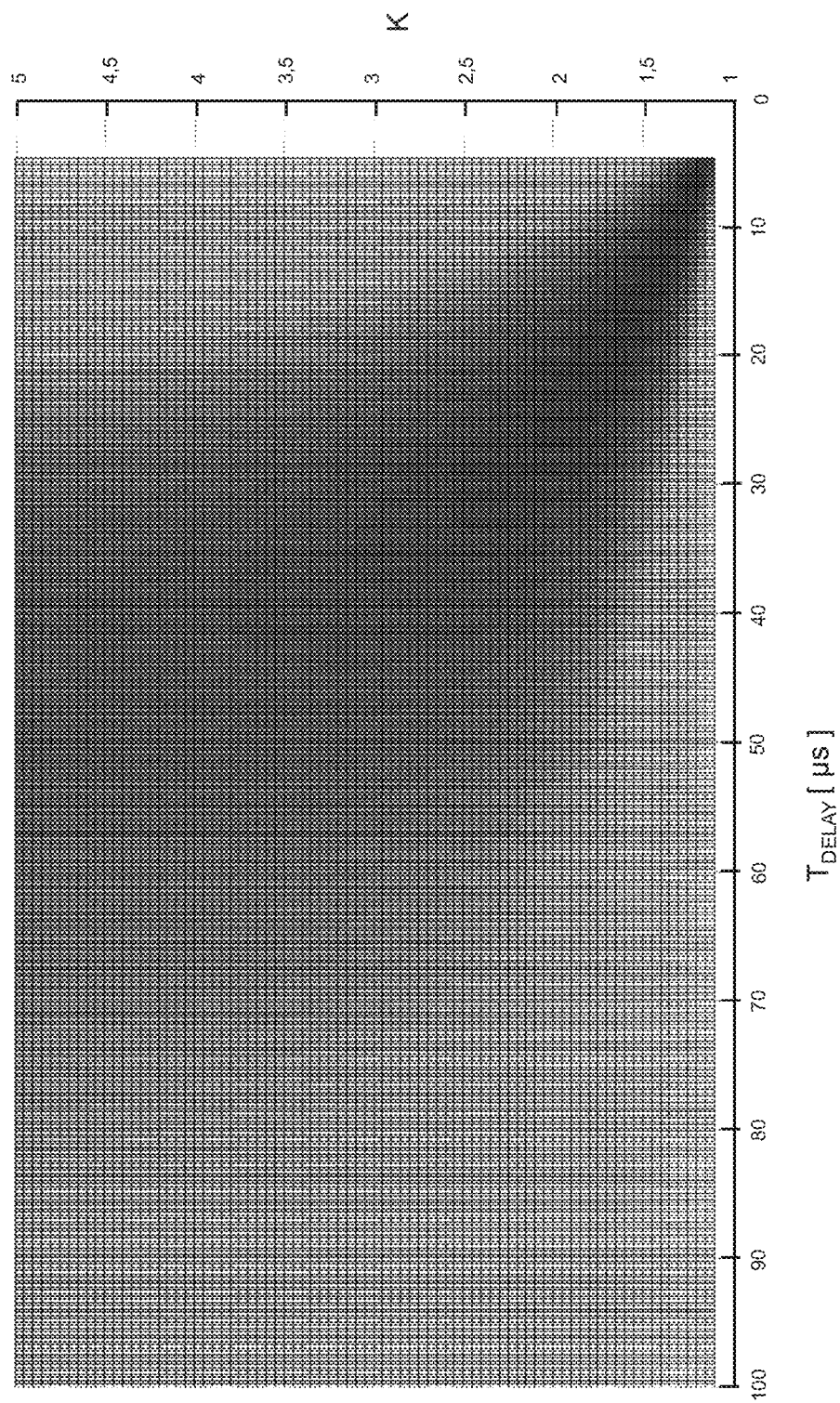
FIG. 6 shows the plot of the matching factor between the transducer and the scavenging-interface circuit of FIGS. 3a, 3b, as the operating parameters vary.

FIG. 6 shows the evolution of the matching efficiency $\eta_{COUPLE}$ as the values $T_{DELAY}$ and K vary. The graph of FIG. 6 can be obtained easily starting from the expression of $P_{CYCLE}$ by varying the parameters $T_{DELAY}$ and K (fixing the values of the external variables $V_{TRANSD}$ and $V_{OUT}$). Corresponding to each value of $\eta_{COUPLE}$ is a pair of values $T_{DELAY}$ and K. It is thus possible to derive in an automatic way the pair of optimal values $T_{DELAY}$ and K to obtain a desired value of matching efficiency $\eta_{COUPLE}$. In the graph of FIG. 6, the darker areas are those in which the value of matching efficiency $\eta_{COUPLE}$ is higher; instead, the lighter areas are those in which the value of matching efficiency $\eta_{COUPLE}$ is lower (low values of $T_{DELAY}$ and high values of K, or high values of $T_{DELAY}$ and low values of K).

Figure 7:
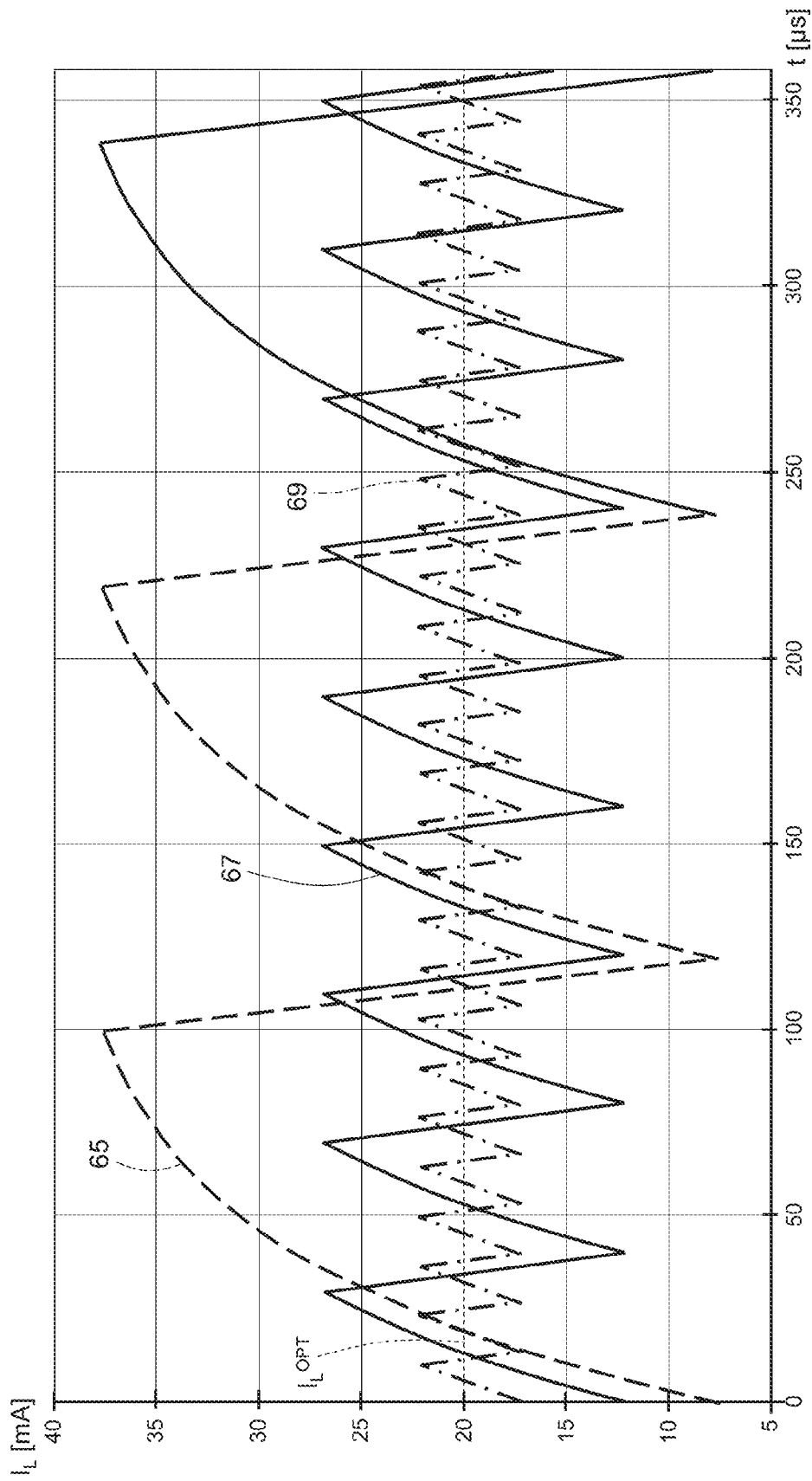
FIG. 7 shows profiles of storage/discharge of current in the energy-scavenging system in the operating conditions of FIGS. 4a and 4b.

FIG. 7 shows profiles of current $I_L$ in the inductor 22b as pairs of values of $T_{DELAY}$ and K vary, and with reference to a optimal ideal current value $I_L^{OPT}$ (condition of matched load in which the matching efficiency is maximum).

In particular, the curve 65 shows the cyclic pattern, in time t, of the profiles of current $I_L$ for high values of $T_{DELAY}$ and K (for example, $T_{DELAY}$=100 μs and K=5). In this case, there is the advantage that the frequency of opening/closing of the HV transistors 30a and 36a (or HV transistors 31a and 38a) is low; this results in a reduced consumption of energy by the rectifier circuit 24 during use. However, the values of peak current $I_p$ reached by the current $I_L$ according to the curve 65 are high, and the impedance matching between the transducer 22 and the rectifier circuit 24 other than optimal, causing a relatively low matching efficiency $\eta_{COUPLE}$ ($\eta_{COUPLE}$≈72.3%).

The curve 67 shows the cyclic pattern, in time t, of the profiles of current $I_L$ for average values of $T_{DELAY}$ and K (for example, $T_{DELAY}$=30 μs and K=2.25). In this case, the frequency of opening/closing of the HV transistors 30a and 36a (or HV transistors 31a and 38a) is higher than in the case of the curve 65, but there is the advantage that the values of peak current are lower than in the case of the curve 65 and the matching efficiency is high ($\eta_{COUPLE}$≈96.5%).

Finally, the curve 69 shows the cyclic pattern, in time t, of the profiles of current $I_L$ for peak values of $T_{DELAY}$ and K (for example, $T_{DELAY}$=10 μs and K=1.3). In this case, the matching efficiency $\eta_{COUPLE}$ is still higher than in the case of the curve 67 (approximately 99.5%), but with the disadvantage that the driving frequency of the HV transistors 30a and 36a (or HV transistors 31a and 38a) is excessively high, thus causing an excessive current consumption by the rectifier circuit 24, with consequent reduction in the efficiency factor $\eta_{SCAV}$ not sufficiently compensated for by the increase in the value of matching efficiency $\eta_{COUPLE}$.

For the purposes of application of the rectifier circuit 24 as energy-scavenging interface in an environmental-energy-scavenging system, a compromise choice, such as for example that of the curve 67, is preferable. It is evident that other contexts of application of the present invention may lead to a different choice of the values of $T_{DELAY}$ and K (and, in general, with K≥1).

Figure 8:
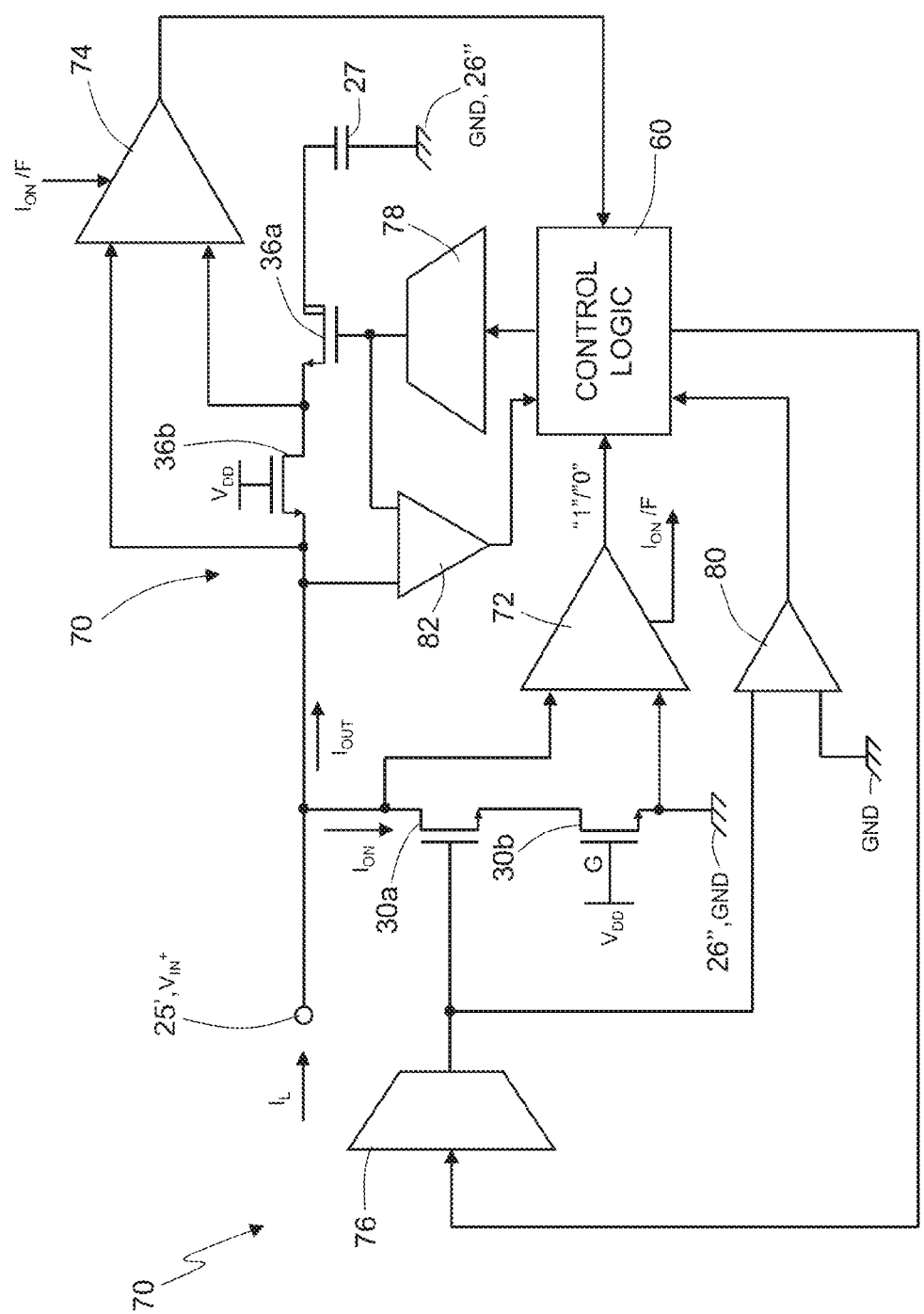
FIG. 8 shows a circuit for management and control of the scavenging-interface circuit of FIGS. 3a, 3b that can be used for positive half-waves of the signal at input to the scavenging-interface circuit.

FIG. 8 shows, by means of functional blocks, a control circuit 70 for driving the HV transistor 30a and the HV transistor 36a in order to implement the operating conditions of FIGS. 4a and 4b. The control circuit 70 operates, in particular, for positive half-waves ($V_{IN}^+$) of the input signal $V_{IN}$. The LV transistor 36b is biased with a gate-to-source voltage ($V_{GS}$) equal to $V_{DD}$, whereas the LV transistor 30b is biased at a constant voltage $V_{DD}$, in such a way as to be kept always in the on state. The value of the voltage $V_{DD}$ is hence chosen on the basis of the characteristics of the transistors 30b and 36b, in such a way as to drive them into the on state.

In order to operate the HV transistor 31a and the HV transistor 38a for negative half-waves of the input signal $V_{IN}$, a circuit architecture similar to the one shown for the control circuit 70 is used (not shown in detail in FIG. 8).

In greater detail, the control circuit 70 comprises a first current detector 72, coupled between the source terminal S of LV transistor 30b and the drain terminal D of the HV transistor 30a, for detecting (during the step of FIG. 4a) when the current $I_{ON}$ that flows through the LV transistor 30b and the HV transistor 30a exceeds the threshold $I_{TH}$. Moreover, the current detector 72 has also the function of generating, during the step of FIG. 4a, a scaled copy of the current that flows in the LV transistor 30b, as described in what follows.

Figure 9:
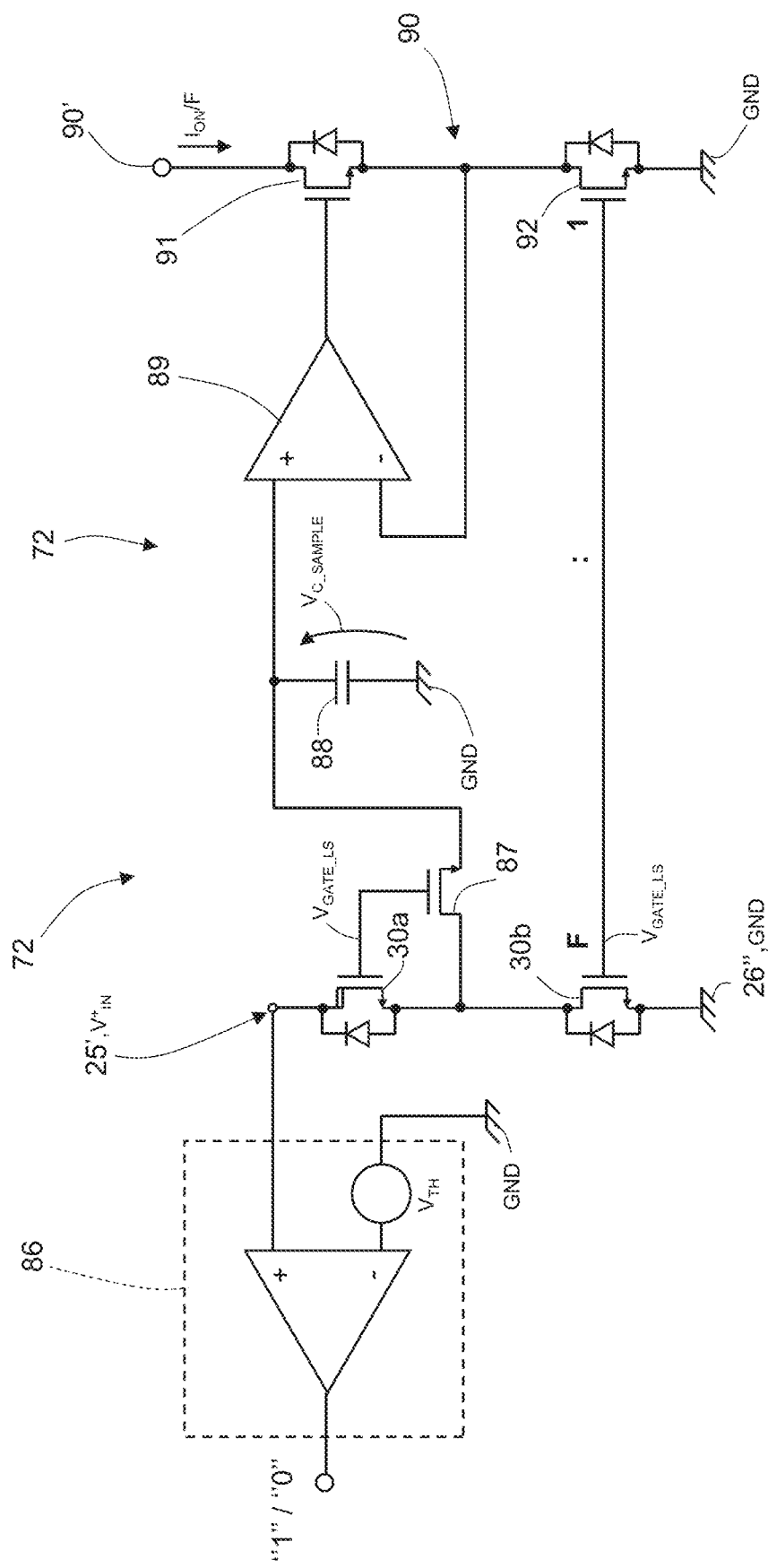
FIG. 9 shows, in greater detail, a portion of the management and control circuit of FIG. 8.

FIG. 9 shows in greater detail the first current detector 72, according to an embodiment. With reference to FIG. 9, a first portion of the current detector 72 comprises a comparator 86 configured to generate a digital output signal indicating whether the current $I_L=I_{ON}$ reaches (or exceeds) the threshold value $I_{TH}$, or instead is below the threshold value $I_{TH}$. To this end, the non-inverting input terminal of comparator 86 is coupled to the input terminal 25' of the rectifier circuit 24 to receive the voltage signal $V_{IN}^+$; and the inverting input terminal of comparator 86 is coupled to a threshold voltage signal generator to receive a threshold-voltage signal $V_{TH}$.

The digital signal outputted by comparator 86 has a low logic level "0" when $V_{IN}^+ < V_{TH}$ (meaning that $I_{ON} < I_{TH}$) and a high logic level "1" when $V_{IN}^+ > V_{TH}$ (meaning that $I_{ON} \leq I_{TH}$), or vice versa.

The threshold-voltage signal $V_{TH}$ is such that $V_{TH}=I_{TH}\cdot (R^{HV}_{ON}+R^{LV}_{ON}$ where $R^{HV}_{ON}$ is the on-state resistance of the HV transistor 30a and $R^{LV}_{ON}$ is the on-state resistance of the LV transistor 30b. When the voltage $V_{IN}^+$ at the input terminal 25' exceeds the threshold voltage $V_{TH}$, the output signal of the comparator 86 changes logic state, signalling the fact that the threshold $V_{TN}$ has been exceeded (and hence indicating that $I_L=I_{ON} \geq I_{TH}$).

The digital signal outputted by the comparator 86 is supplied to the control logic 60, which, once the time interval TDELAY has elapsed, opens the HV transistor 30a.

The duration of the time interval $T_{DELAY}$, according to the amplitude of the signal $V_{TRANSD}$ of the transducer 22a, can be determined either by the control logic 60 or by the comparator 86 belonging to the current detector 72.

In the latter case, the signal at output from the comparator 86 assumes a high logic level when $I_{ON} \geq I_{TH}$ and $t \geq T_{DELAY}$, and the control logic 60 opens the HV transistor 30a at the rising edge of the digital signal generated by the comparator 86.

A second portion of the current detector 72 comprises a negative-feedback loop including an amplifier 89 that controls the current that flows on an output branch 90 of the current detector 72 by acting on the control terminal of a transistor 91 belonging to the output branch 90 (i.e., by opening/closing the transistor 91). The negative feedback ensures that the voltage on the inverting input of the amplifier 89 is always equal to the voltage present on the non-inverting input of the amplifier 89. The output branch 90 moreover comprises a further transistor 92 having dimensions (known as W/L ratio) that are smaller by a factor F than the respective dimensions (known as W/L ratio) of the LV transistor 36b.

In use, current always flows in the output branch 90. In the step of FIG. 4a the current is variable and equal to $I_{ON}/F$, while in the step of FIG. 4b the current is constant and equal to $I_P/F$. Sizing of the transistor 92 guarantees that the current that flows in the output branch 90 is a fraction 1/F of the current $I_{ON}$ (or of its peak value $I_P$, as has been said).

With reference to FIG. 8, the control circuit 70 further comprises a second current detector 74, coupled to the source terminal S and to the drain terminal D of the LV transistor 36b. The second current detector 74 is similar to the first current detector 72 and is configured for detecting the value of current that flows through the LV transistor 36b (and, consequently, through the HV transistor 36a) during the operating step of FIG. 4b. In particular, the second current detector 74 co-operates with the control logic 60 in order to detect whether the current $I_{OUT}$ reaches the minimum expected value $I_{OFF}=I_P/K$. The output signal of the second current detector 74, indicating the current value $I_{OUT}$, is supplied at input to the control logic 60.

The second current detector 74 receives at input the current $I_{ON}/F$ (generated by the first current detector 72, as has been described previously), and switches when the current $I_{OUT}$ reaches the minimum expected value given by $I_{OFF}=I_P/K$.

The control circuit 70 further comprises a first driving device 76 and a second driving device 78, coupled, respectively, between the control logic 60 and the control terminal G of the HV transistor 30a and of the HV transistor 36a. The first driving device 76 and the second driving device 78 are, in themselves, of a known type, and are designed to drive into an open/closed state the transistors 30a, 36a on the basis of a control signal received from the control logic 60. In particular, in the operating condition of FIG. 4a, the control logic 60 drives, via the first driving device 76, the HV transistor 30a into the closed state and, via the second driving device 78, the HV transistor 36a into an open state.

When, on the basis of the signal generated at output from the first current detector 72, the control logic 60 detects that the current $I_L=I_{ON}$ has reached (and/or exceeded) the threshold value $I_{TH}$, and the time $T_{DELAY}$ has elapsed, the control logic 60 drives, via the first driving device 76, the HV transistor 30a into an open state and, via the second driving device 78, the HV transistor 36a into the closed state. Then, the control logic 60 monitors, on the basis of the signal received from the second current detector 74, the value of the current $I_{OUT}$ for controlling passage from the current operating condition (of supply of the load, FIG. 4b) to the operating condition of storage of energy in the inductor 22b (FIG. 4a), as soon as the current $I_{OUT}$ reaches the value $I_{OFF}$.

The control circuit 70 further comprises a first voltage detector 80 and a second voltage detector 82, which are, respectively, coupled between the control terminal G and the source S of the HV transistor 30a and of the HV transistor 36a. The first voltage detector 80 detects the voltage present between the control terminal G of the HV transistor 30a and the source terminal S of the LV transistor 30b (in this case, corresponding to the reference terminal GND) and generates an output signal indicating said voltage. The output signal generated by the first voltage detector 80 is supplied to the control logic 60. Likewise, the second voltage detector 82 detects the voltage present between the control terminal G of the HV transistor 36a and the source terminal S of the LV transistor 36b (in this case, corresponding to the input node 25') and generates an output signal indicating said voltage. On the basis of the signals received by the first and second voltage detectors 80, 82, the control logic 60 knows the state, whether on or off, of the HV transistors 30a and 36a, and controls passage from the operating condition of FIG. 4a to the operating condition of FIG. 4b (and vice versa) inserting appropriate dead times between opening (closing) of the HV transistor 30a and closing (opening) of the HV transistor 36a. There are thus prevented phenomena of cross conduction and direct connection between the first output terminal 26' (to which the capacitor 27/load 28 is coupled) and the ground-reference terminal GND.

What has been described herein, both from a circuit standpoint and from the standpoint of method for operating the control circuit 70, can be applied in a corresponding way evident for the person skilled in the sector, to the HV transistors 31a and 38a, which are driven for rectification of negative half-waves of the voltage $V_{TRANSD}$ (the LV transistors 31b and 38b are kept always on, in a way similar to what has been described for the LV transistors 30b and 36b).

FIG. 9 has already been introduced and it shows the first current detector 72 in greater detail. According to the embodiment of FIG. 9, the first current detector 72 further comprises means configured to store the peak value $I_P$ of the current $I_{ON}$ that flows, during use, through the HV transistor 30a.

The first current detector 72 further comprises a transistor 87 having a drain terminal common to the drain terminal of the LV transistor 30b, and its source terminal coupled to a capacitor 88 (the second terminal of the capacitor 88 is connected to the reference voltage GND). The control terminal G of the transistor 87 is connected to the control terminal G of the HV transistor 30a. In this way, the HV transistor 30a and the transistor 87 are driven into an open/closed state by one and the same signal $V_{GATE\_LS}$.

During the time interval $T_{DELAY}$ (situation of FIG. 4a), the HV transistor 30a is closed (the signal $V_{GATE\_LS}$ has a high value and drives the HV transistor 30a into the closed state). Likewise, also the transistor 87 is closed. The capacitor 88 is consequently charged to the voltage present on the first input terminal 25' of the rectifier circuit 24 (in FIG. 9 the voltage across the capacitor 88 is designated by $V_{C\_SAMPLE}$).

The first current detector 72 moreover comprises a further comparator 89 and a branch 90 including a transistor 91 and a transistor 92 connected in series together between a terminal 90' and the reference terminal GND. In particular, the transistor 91 has its own source terminal coupled to the drain terminal of the transistor 92; moreover, the transistor 92 has its own control terminal G connected to a constant-voltage supply terminal $V_{DD}$. It should be noted that the transistor 92 is a low-voltage transistor, for example a CMOS. In particular, the transistor 92 is able to operate with gate-to-source voltages in the 1-5 V range, in particular 2.5V-3.6 V, for example 3.3 V. Other technologies for low-voltage transistors envisage slightly higher operating voltages, for example in the region of 4-5 V. In particular, the transistor 92 is of the same type as the LV transistor 30b, but it has dimensions (measured in terms of shape factor W/L, width/length) F times smaller than the corresponding dimensions of the LV transistor 30b, and thus it is configured to conduct a current F times lower than the value assumed by $I_{ON}$ (wherein $I_{ON}$ is the current that flows through the LV transistor 30b). The LV transistor 30b and the transistor 92 moreover have their respective control terminals connected together and biased at the voltage $V_{DD}$. The negative feedback, provided by means of the comparator 89 and the transistor 91, ensures that the drain voltages of the transistors 30b and 92 are identical. Consequently, the current that flows through the transistor 92 assumes values equal to the value of $I_{ON}$ scaled by the factor F (when $I_{ON}$ reaches the peak value $I_P$ said current will be equal to $I_P/F$). There is thus generated a scaled copy of the factor F of the peak current $I_P$. Since both of the transistors 30b and 92 are low-voltage transistors (e.g., CMOSs) they provide excellent matching properties so that the factor F is affected to a minimal extent by problems of mismatch between the transistors 30b and 92 (as, instead, the case if the transistor 30b and 92 were high-voltage transistors). This enables a scaled copy of the peak current $I_P$ to be obtained that is stable and with has a reproducible value.

The comparator 89 is connected to the source terminal of the transistor 87, and, when the transistor 87 is closed, it receives at input (on the non-inverting terminal) the voltage of the drain terminal of the LV transistor 30b, and at input (on the inverting terminal) the signal present on the drain terminal of the transistor 92 and source terminal of the transistor 91; the output of the comparator 89 is coupled to the control terminal G of the transistor 91. The transistor is always closed; the comparator 89 biases the control terminal of the transistor 91 in such a way that on the branch 90 there flows the current $I_{ON}/F$, as desired.

The negative feedback provided by the comparator 89 ensures that the signal at input to the non-inverting terminal of the comparator 89 and the signal at input to the inverting terminal of the comparator 89 are equal, so that the LV transistor 30b and the transistor 92 will have the same source-to-drain and source-to-gate voltages.

When the HV transistor 30a is open, also the transistor is open, and the capacitor 88 is in a floating state, ensuring, during the time interval $T_{CHARGE}$, a current of a practically constant value, and equal to the value $I_P/F$, through the transistor 92.

In fact, during the step of supply of the capacitor 27/load 28, the capacitor 88 ensures maintenance of the voltage $V_{C\_SAMPLE}$ across it, guaranteeing an input signal that is substantially constant (but for the losses of the capacitor 88) on the non-inverting input of the comparator 89. This makes it possible to keep unaltered the generation of the current $I_{ON}/F$ on the output branch 90 of the first current detector 72 during the step of FIG. 4b (in this step, the current $I_{ON}$ has reached the peak value $I_P$, and consequently flowing in the output branch 90 of the first current detector 72 is a current $I_P/F$).

Figure 10A:
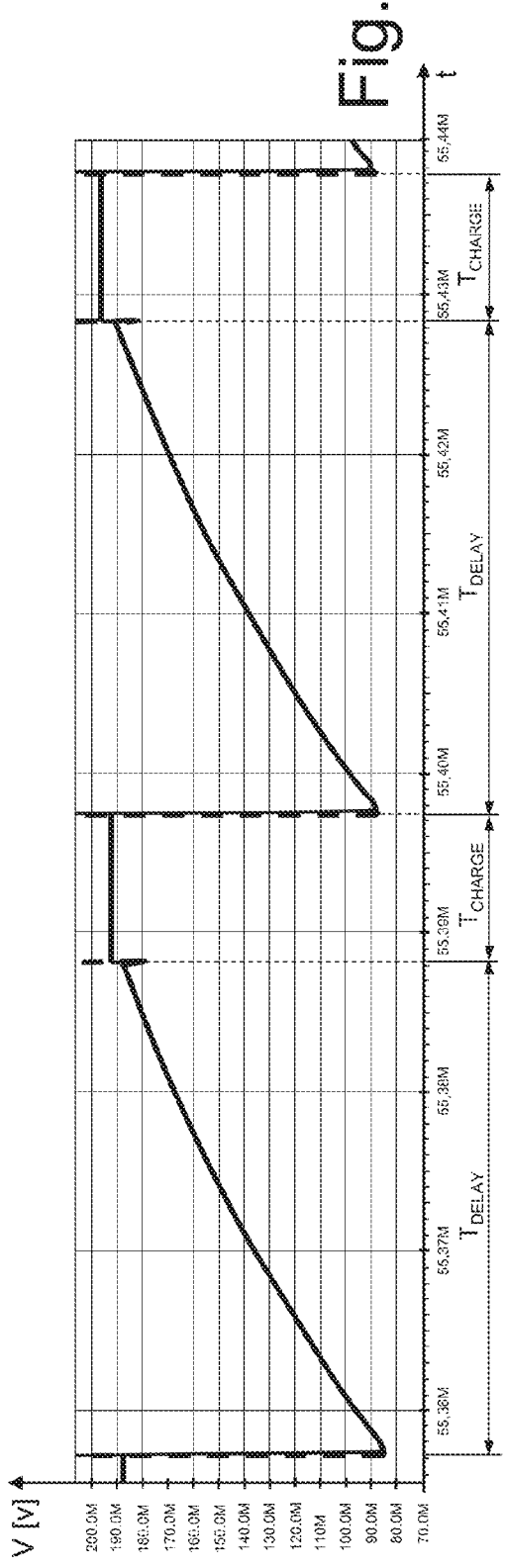
FIGS. 10a and 10b illustrate, using one and the same time scale, the time plot of current signals in the circuit of FIG. 8, in particular for showing a step of passage between the operating condition of FIG. 4a and the operating condition of FIG. 4b.
Figure 10B:
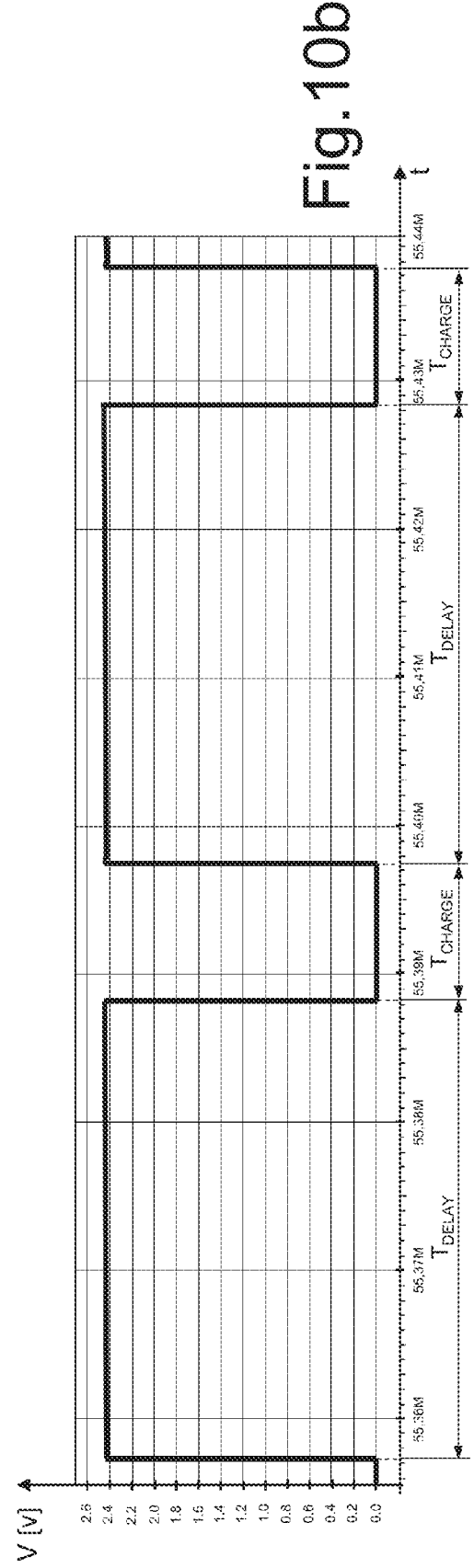

FIG. 10a shows graphically the time plot of the voltage on the drain terminal of the LV transistor 30b and of the voltage signal $V_{C\_SAMPLE}$ across the capacitor 88. These signals have the same evolution and coincide with one another in FIG. 10a. FIG. 10b shows the time plot of the signal $V_{GATE\_LS}$ applied to the control terminals of the HV transistor 30a and of the transistor 87.

At the end of $T_{CHARGE}$ the voltage $V_{C\_SAMPLE}$ drops to the value $I_{OFF} \cdot (R^{HV}_{ON} + R^{LV}_{ON})$ where $R^{HV}_{ON}$ and $R^{LV}_{ON}$ are, respectively, the on-state resistances of the HV transistor 30a and the LV transistor 30b.

Figure 11:
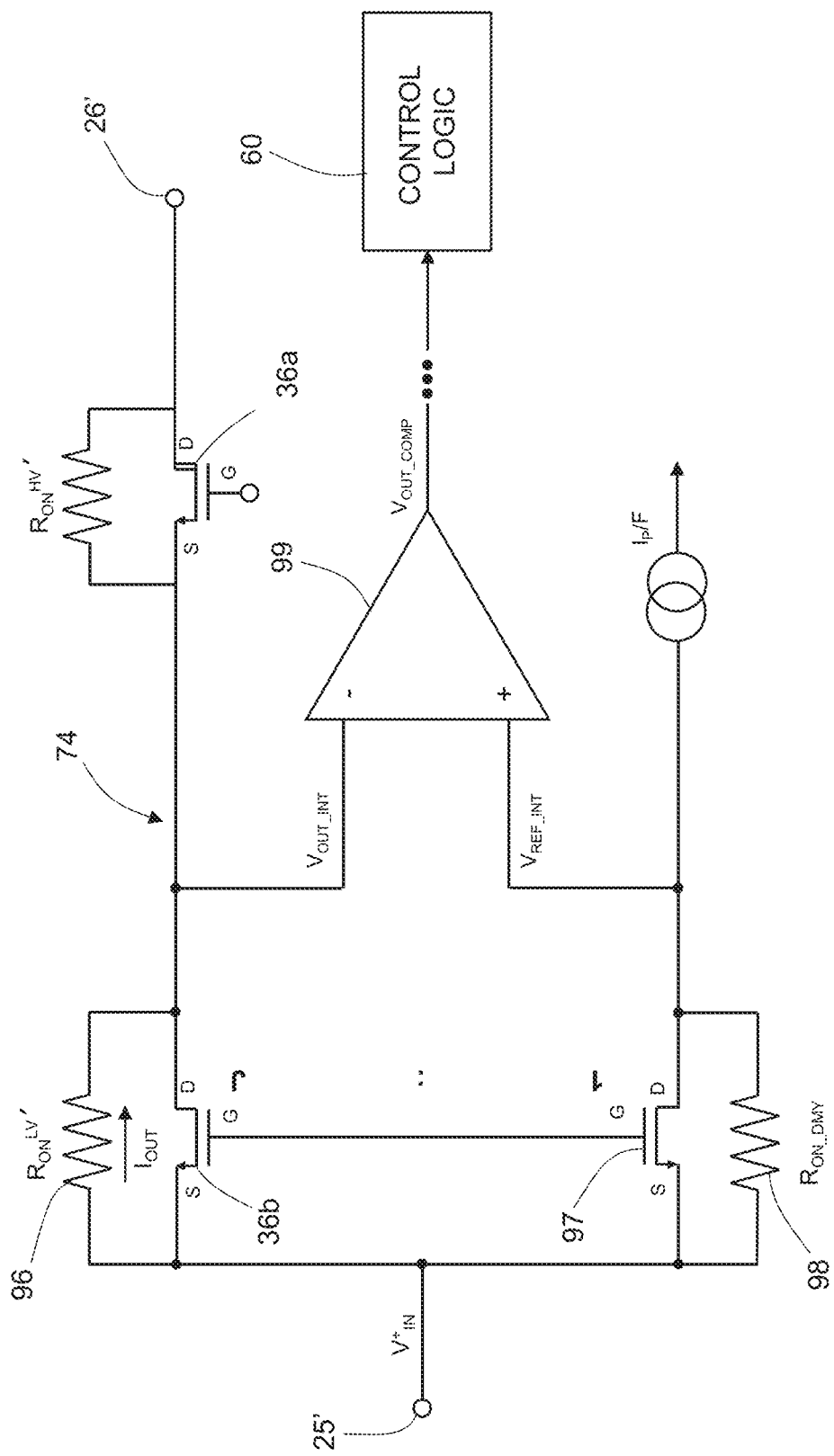
FIG. 11 shows, in greater detail, a further portion of the management and control circuit of FIG. 8.

FIG. 11 shows, in greater detail, the second current detector 74. The second current detector 74 of FIG. 11 comprises a transistor 97, having a source terminal S connected to the first input terminal 25' of the rectifier circuit 24, a control terminal G connected to the control terminal G of the LV transistor 36b, and a drain terminal D. In parallel to the transistor 97 a resistor 98 is shown representing the on-state electrical resistance $R_{ON\_DMY}$ of the transistor 97. Likewise, also the LV transistor 36b and the HV transistor 36a are shown with their own respective on-state electrical resistances $R^{LV}_{ON}$ and $R^{HV}_{ON}$ connected in parallel (resistors 96 and 95).

The second current detector 74 further comprises a comparator 99, having an inverting terminal connected between the drain terminal of the LV transistor 36b and the source terminal of the HV transistor 36a (to receive an intermediate output signal $V_{OUT\_INT}$), and a non-inverting terminal connected to the drain terminal of the transistor 97 (to receive an intermediate reference signal $V_{REF\_INT}$).

The transistor 97 is a replica, scaled by a factor J, of the LV transistor 36b. Consequently, the transistors 36b and are sized in such a way that the transistor 97 has dimensions (measured in terms of shape factor W/L, width/length) that are J times smaller than those of the LV transistor 36b and is designed to conduct a current F times lower than the value assumed by $I_{ON}$ (i.e., $I_{ON}/F$) during the step of FIG. 4a, and a current F times lower than the peak value $I_P$ (i.e., $I_P/F$) during the step of FIG. 4b.

The intermediate voltage signal $V_{REF\_INT}$ at input to the comparator 99 (on the non-inverting terminal) is given (at time $t_c$ of FIG. 5c) by:

$$V_{REF\_INT} = V_{IN}^+ - J \cdot R_{ON\_DMY} \cdot I_P/F$$

The voltage signal $V_{OUT\_INT}$ at input to the comparator 99 (on the inverting terminal) is given by:

$$V_{OUT} = V_{IN}^+ - R_{ON}^{LV} \cdot I_{OUT}$$

where $I_{OUT}$ is the current that flows through the transistors 36b and 36a when they are in the on state.

It follows that, since the condition that determines the change of the output of the comparator 99 is $V_{REF\_INT} = V_{OUT\_INT}$, the value of $I_{OUT}$ at which there is a change of output of the comparator 99 is precisely the current value $I_{OUT} = I_{OFF}$ previously introduced. Consequently, since $I_{OUT} = I_{OFF}$ we obtain $I_{OFF} = J/F \cdot I_P$, and, defining $K = F/J$, the condition previously indicated ($I_{OFF} = I_P/K$) that determines the threshold of passage from the operating condition of FIG. 4b to the operating condition of FIG. 4a is obtained.

It is pointed out that both of the transistors 36b and 97 are low-voltage transistors (e.g., CMOSs) of the same type and hence they guarantee excellent matching properties, such that the factor J is affected to a minimal extent by problems of mismatch between the transistors 36b and 97 (as, instead, would be the case if both of the transistors were high-voltage transistors). Stabilizing J around a value corresponds desired to stabilizing the value of K around the value chosen. Moreover, since also the factor F is stable, the parameter K has a minimal spread around the chosen and desired value.

FIGS. 12a-12c show, using one and the same time scale: the plot of the signals $V_{IN}^+$, $V_{REF\_INT}$, $V_{OUT}$ (FIG. 12a); the plot of the signal $V_{OUT\_COMP}$ generated at output from the comparator 99 (FIG. 12b); and the plot of the current signal $I_L$ (FIG. 12c).

With reference to FIG. 12a, it may be noted that to an (ideal) rising edge of the input signal $V_{IN}^+$ there corresponds a progressive fall of the signal $V_{REF\_INT}$ and a corresponding progressive rise of the signal $V_{OUT}$. Hence, with further reference to FIG. 12b, when $V_{REF\_INT} = V_{OUT}$ (instant $t_x$), the output $V_{OUT\_COMP}$ of the comparator 99 changes state and passes from a low-value state a high-value state. The change of state is recognized by the control logic 60, which controls accordingly the HV switches (transistors) 30a and 36a as has been described previously.

FIG. 12c shows the current $I_L$, in particular during the time interval $T_{CHARGE}$ (operating condition of FIG. 4b). The current $I_L = I_{OUT}$ decreases from a maximum value $I_P$ to a value minimum $I_{OFF}$, supplying the capacitor 27/load 28.

What has been described previously applies, in an altogether equivalent way, to control of the HV switches (transistors) 31a and 38a, for negative polarities of the input voltage $V_{IN}$.

The control logic 60 implements the method of control of the HV transistors 30a, 36a, 31a, and 38a described previously and shown schematically in FIG. 13, by means of a flowchart.

Figure 13:
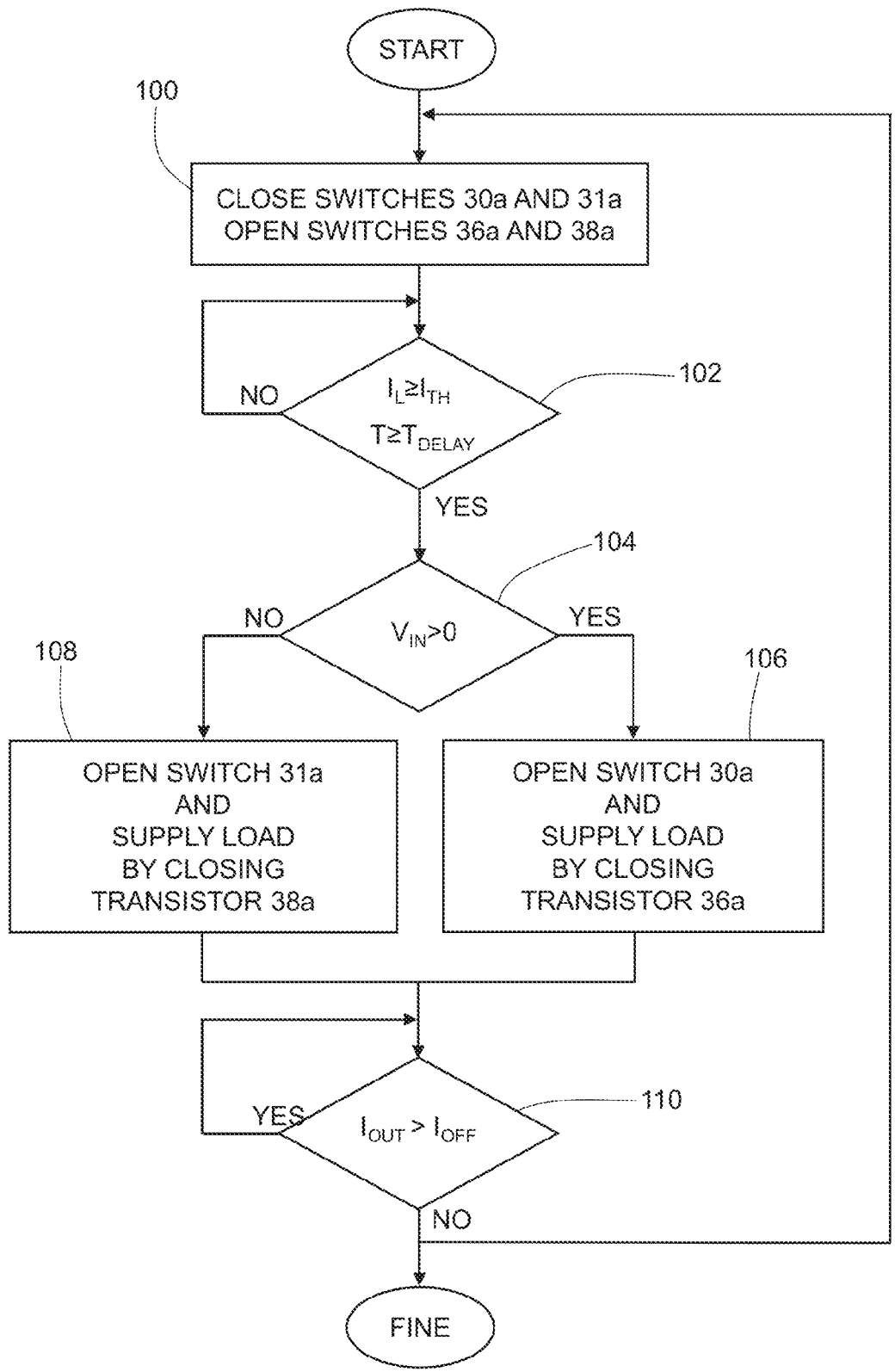
FIG. 13 shows, using a flowchart, steps of a control method for driving the energy-scavenging system of FIG. 3a or FIG. 3b, according to one embodiment of the present invention.

With reference to FIG. 13, step 100, the HV transistors 30a and 31a are closed. The HV transistors 36a and 38, instead, are opened. In the sequel of the description the LV transistors 30b, 31b, 36b and 38b are always assumed as being in the closed state (situation of FIG. 3b).

In this way, the inductor 22b is charged via the current $I_L = I_{ON}$ that flows through the HV transistors 30a and 31a.

The current value $I_L = I_{ON}$ is monitored (step 102) for detecting whether it reaches (or exceeds) the required threshold value $I_{TH}$. At the same time, the control logic 60 monitors the time interval $T_{DELAY}$. In this case, the time $t_0$ of start of the time interval $T_{DELAY}$ corresponds to the closing instant of the HV transistors 30a, 31a, according to step 100.

In the case where the current $I_L$ has not reached the threshold $I_{TH}$ or the time $T_{DELAY}$ has not elapsed (output NO from step 102), it is necessary to wait for both of these conditions to be met, and the control logic 60 keeps the system 20 in the states 100, 102 until the condition $I_L \geq I_{TH}$ is satisfied. Otherwise (output YES from step 102), flow passes to the next step 104.

During step 104 a check is made to verify whether the input voltage $V_{IN}$ has a positive polarity or a negative polarity. This operation can be carried out by means of the comparator 86, which receives at input the signal $V_{IN}^+$.

As has already been said, a circuit equivalent to the shown in FIG. 9 is coupled (in a way not shown in Figure) to the HV transistor 31a, and used in a similar way to verify whether the input voltage $V_{IN}$ has a negative polarity.

In the case where the input voltage $V_{IN}$ has a positive polarity, control passes to step 106 (output YES from step 104), where the HV transistor 30a, and possibly the LV transistor 30b, are opened to supply the capacitor 27/load 28 via the HV transistors 36a and LV switch 36b.

In the case where the input voltage $V_{IN}$ has negative polarity, control passes, instead, to step 108 (output NO from the step 104), where the capacitor 27/load 28 is supplied via the LV transistor 38b and HV transistor 38a.

Exit from steps 106 and 108 leads to step 110, where the control logic 60 monitors the value of current $I_{OUT}$ that flows through the LV transistor 36b (or the LV transistor 38b according to the polarity of the input voltage $V_{IN}$) towards the output of the rectifier 24 for detecting whether the current $I_{OUT}$ assumes a value equal to $I_{OFF}$. As long as $I_{OUT} > I_{OFF}$, the control logic 60 keeps the system 20 in the step of charging of the capacitor 27/supply of the load 28. When $I_{OUT} = I_{OFF}$, control returns to step 100. The steps 100-104 are executed, as described with reference to FIGS. 5a-5c, in a time interval equal to at least $T_{DELAY}$ until the current in the inductor reaches the threshold $I_{TH}$ whereas the steps 106-110 are executed within the time interval $I_{CHARGE}$.

The control logic 60 is, for example, a microcontroller configured for driving the HV transistors 30a, 31a, 36a, and 38a in order to carry out the steps of the method of FIG. 13.

Figure 14:
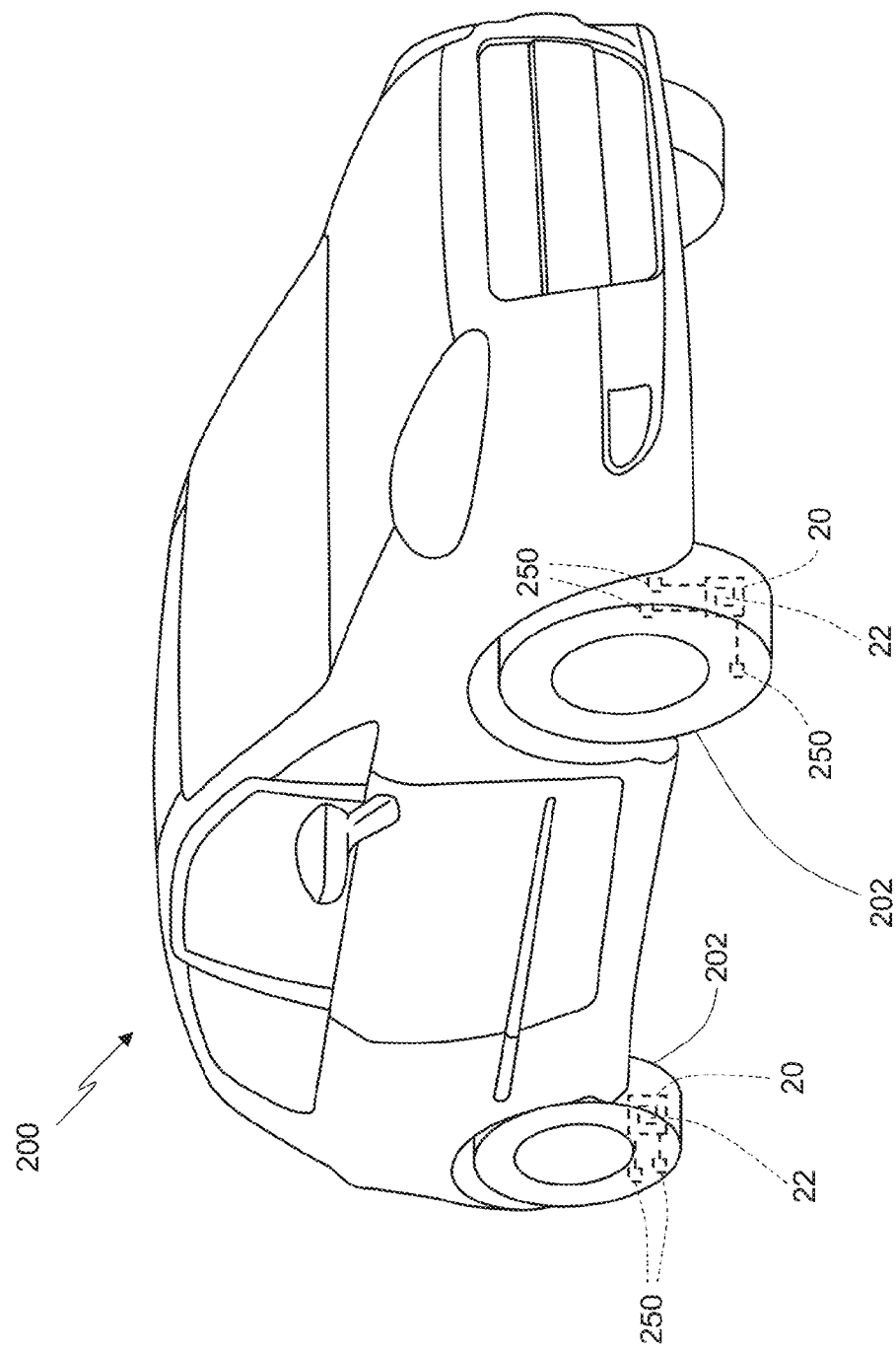
FIG. 14 shows a vehicle comprising the energy-scavenging system of FIG. 3a or FIG. 3b.

FIG. 14 shows a vehicle 200 comprising the energy-scavenging system 20 of FIG. 3. The vehicle 200 is, in particular, a motor vehicle. It is evident, however, that the energy-scavenging system 20 can be used in any vehicle 200 or in systems or apparatuses different from a vehicle. In particular, the energy-scavenging system 20 can find application in generic systems in which it is desirable to harvest, store, and use environmental energy, in particular by means of conversion of mechanical energy into electrical energy.

With reference to FIG. 14, the vehicle 200 comprises one or more transducers 22 coupled in a known way to a portion of the vehicle 200 that is subject to mechanical stresses and/or vibrations, for converting said mechanical stresses and/or vibrations into electric current.

The energy-scavenging system 20 is connected to one or more electrical loads 28a . . . 28n, for example via interposition of a DC-DC converter. In particular, according to an application of the present invention, the electrical loads 28a . . . 28n comprise TPM (tire-parameter monitoring) sensors 250 for monitoring parameters of tires 202. In this case, the TPM sensors 250 are coupled to an internal portion of the tires 202 of the vehicle 200. Likewise, also the transducers 22 (for example, of an electromagnetic or piezoelectric type) are coupled to an internal portion of the tires 202. The stress of the transducers 22 when the vehicle 200 is travelling causes production of an electric current/voltage signal at output from the transducer 22 by means of conversion of the mechanical energy into electrical energy. The electrical energy thus produced is stored, as has been described previously, in the storage element 27 and supplied, via the DC-DC converter that may possibly be present, to the TPM sensors 250.

According to one embodiment of the present invention, the energy-scavenging system 20, comprising one or more transducers, and the TPM sensors 250, are glued inside one or more tires 202. Impact of the tires 202 on the ground during motion of the vehicle 200 enables production of electrical energy.

As an alternative to what is shown in FIG. 14, the energy-scavenging system 20 can be arranged in any other portion of the vehicle 200, and/or used for supplying an electrical load other than or additional to the TPM sensors 250.

Figure 15:
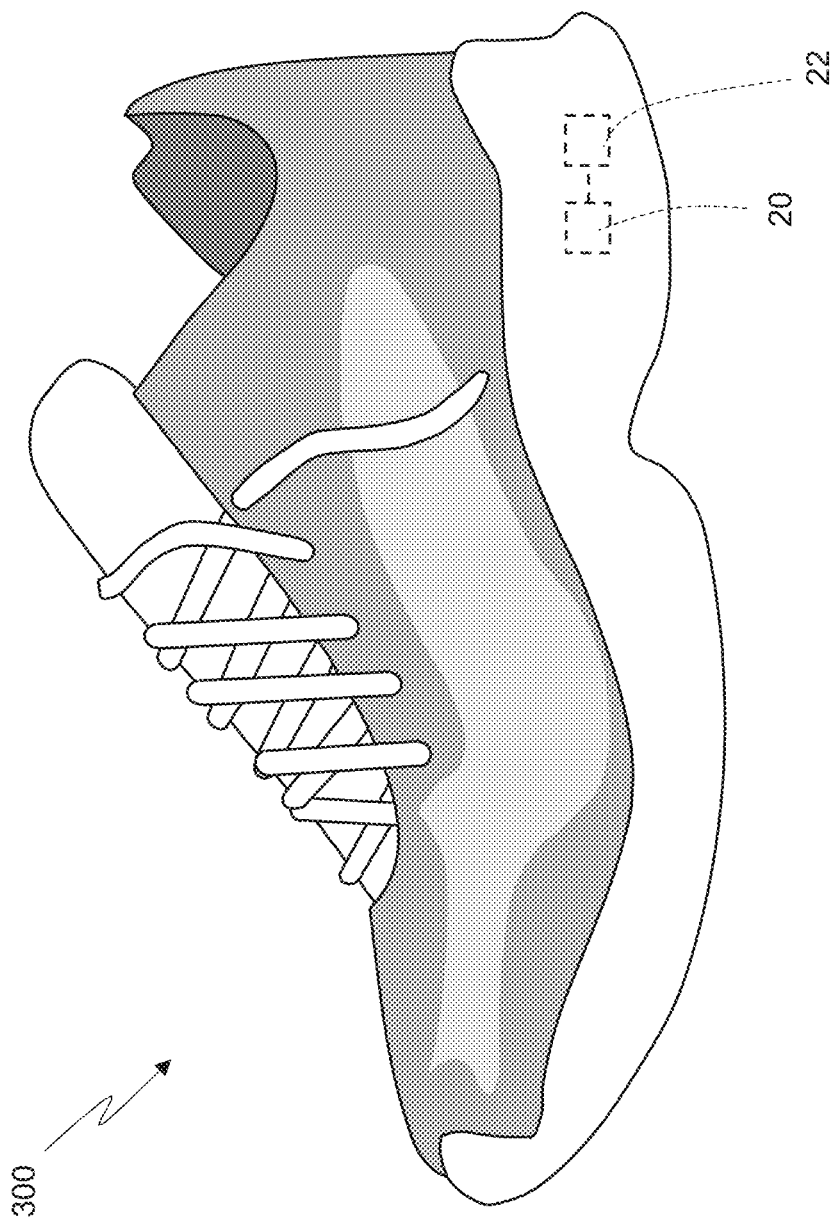
FIG. 15 shows an item of footwear comprising the energy-scavenging system of FIG. 3a or FIG. 3b.

Another possible application of the energy-scavenging system 20 is the generation of electrical energy by exploiting the mechanical energy produced by a person when he is walking or running. In this case, the energy-scavenging system 20 is set inside the shoes 300 of said person (for example, inside the sole) as shown schematically in FIG. 15. In systems aimed at fitness, where it is of particular interest to count the steps, it is useful to recover energy from the vibrations induced by walking/running in order to be able to supply without using batteries acceleration sensors and/or RFID transmitters that are able to communicate with cell-phones, music-player devices, or any other apparatus that might require information on the steps made.

From an examination of the characteristics of the invention provided according to the present disclosure the advantages that it affords are evident.

In particular, the parameter K has a highly reproducible value (minimum spread) so as to increase the performance, robustness and efficiency of the system 20, minimizing the mismatch between the positive and negative polarities of the signal of the transducer and preventing phenomena of reversal of the flow of current from the capacitor 27 to the input terminals 25', 25" of the rectifier circuit 24.

Moreover, since the duration of the time interval $T_{DELAY}$ is (typically) constant, the rectifier 24 operates at constant duty cycle of the signal of opening/closing of the first and second switches 30, 31. This enables values of efficiency $\eta_{SCAV}$ (efficiency of the rectifier 24, having the function of scavenging interface of the system 20) to be obtained that are particularly high (the present applicant has found efficiency values higher than 95% irrespective of the values assumed by $V_{TRANSD}$ and $V_{OUT}$).

The scavenging efficiency is moreover high even when the amplitude of the signal $V_{TRANSD}$ of the transducer 22 is lower than the voltage value stored in the capacitor 27, overcoming a limitation of the diode-bridge rectifier architecture.

Moreover, since in the case of a transducer 22 of an electromagnetic type the rectifier 24 exploits the inductor 22b inside the transducer 22, the scavenging efficiency is high even when the amplitude of the signal of the transducer is low.

The limitation imposed by diode-bridge rectifiers, which require a voltage of the transducer $V_{TRANSD}$ higher than $2V_{TH\_D}$, where $V_{TH\_D}$ is the threshold voltage of the diodes of the rectifier, is in this way overcome.

Using an HV (high-voltage) technology for the capacitor 27 and for the scavenging interface, it is possible to store high voltages, and hence a high energy, in the capacitor, increasing the autonomy of operation of the TPM sensors 250 accordingly.

The method described, which envisages the choice of an optimal value of $T_{DELAY}$ and of K, enables implementation of an active control (of the mean value and of the ripple) of the current supplied by the transducer, and enables an optimal matching of impedance between the transducer 22 and the scavenging interface 24. This ensures an efficiency $\eta_{SCAV}$ of the scavenging interface 24b that is high irrespective of the velocity of rotation of the tyres 202 and of the conditions of storage of energy in the capacitor 27.

Moreover, as has been said, the value of the interval $T_{DELAY}$ may be varied according to the particular application in which the rectifier 24 operates. The rectifier 24 thus finds use in systems other than the energy-scavenging system 20, i.e., ones based upon electromagnetic transducers of any type.

In addition, the rectifier circuit 24 may be used with transducers of another type, by interposition of an appropriate circuit between the transducer and the rectifier circuit designed to provide a storage of energy similar to the inductor 22b.

Moreover, the rectifier 24 according to the present invention and the energy-scavenging system 20 are of a fully integrated type, and consequently require minimal space for installation.

Figure 1:
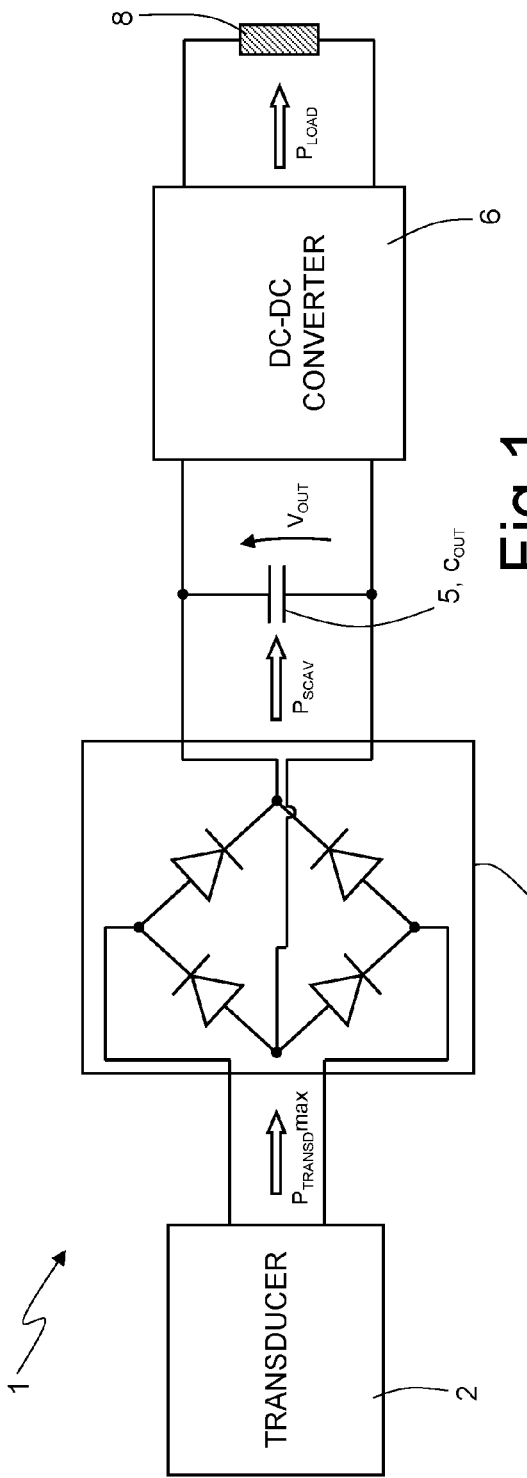
FIG. 1 shows an energy-scavenging system according to a known embodiment.
Figure 2:
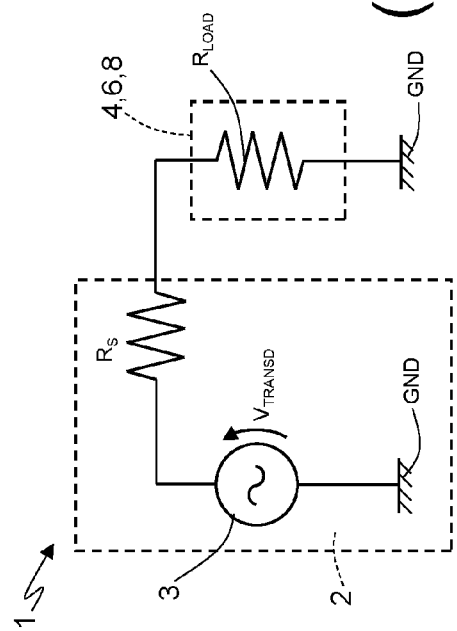
FIG. 2 shows a circuit equivalent to the energy-scavenging system of FIG. 1.

Finally, harvesting of environmental energy is obtained even when the signal of the transducer is lower than the voltage value stored on the output capacitor, something which is not possible using a diode-bridge interface of a known type as shown in FIG. 1. According to the present invention, the scavenging interface 24 is hence able to harvest energy even when the power supplied by the transducer is very low.

Finally, it is clear that modifications and variations may be made to what has been described and illustrated herein, without thereby departing from the sphere of protection of the present invention, as defined in the annexed claims.

In particular, according to an embodiment of the present invention, the rectifier circuit 24 may comprise a number of transistors different from the one described. For example, the rectifier circuit 24 may be a half-wave rectifier, comprising only the switches that operate for positive polarity of the input signal $V_{IN}$ (i.e., the switches 30a, 30b, 36a, and 36b) or only the switches that operate for negative polarities of the input signal $V_{IN}$ (i.e., the switches 31a, 31b, 38a, and 38b).

The use of a half-wave rectifier may be advantageous in the case where the input signal $V_{IN}$ is of a known type and comprises only positive (or negative) half-waves. Its use is, however, not recommended (even though it is possible) in energy-scavenging systems in so far as part of the input signal would be lost, at the expense of the efficiency of the system as a whole.

In addition, the conditions $t > T_{DELAY}$ and $I_L > I_{TH}$ expressed with reference to the operating condition of FIG. 4a are not always both necessary. In particular, for voltage signals generated by transducers 22 of a known type the voltage value always reaches peaks such as to enable the threshold $I_{TH}$ to be exceeded within the time $T_{DELAY}$. Moreover, an appropriate choice of $T_{DELAY}$ always guarantees, for practical purposes, that an acceptable minimum threshold $I_{TH}$ is reached.

Furthermore, there may be present a plurality of transducers 22, all of the same type or of types different from one another, indifferently. For example, the transducer/transducers may be chosen in the group comprising: electrochemical transducers (designed to convert chemical energy into an electrical signal), electromechanical transducers (designed to convert mechanical energy into an electrical signal), electroacoustic transducers (designed to convert pressure variations into an electrical signal), electromagnetic transducers (designed to convert a magnetic field into an electrical signal), photoelectric transducers (designed to convert light energy into an electrical signal), electrostatic transducers, thermoelectric transducers, piezoelectric transducers, thermoacoustic transducers, thermomagnetic transducers, thermoionic transducers.

What is claimed is:

1. An energy-scavenging interface, comprising:
   a first input terminal configured to receive an electrical input signal from a first terminal of a first storage element;
   a second input terminal coupled to a second input terminal of the first storage element;
   a first output terminal connected to a first terminal of a second storage element and configured to supply an output signal;
   a second output terminal connected to a second terminal of the second storage element;
   a first transistor switch and a second transistor switch having source-drain paths connected in series between the first input terminal and the second output terminal;
   a third transistor switch and a fourth transistor switch having source-drain paths connected in series between the first input terminal and the first output terminal; and
   a control circuit including a current mirror circuit connected to the second transistor switch, said control circuit configured to:
   control the first and second transistor switches in a closed state and the third transistor switch in an open state for a first time interval having at least one first time duration during which the first storage element stores electric charge;
   generate using the current mirror circuit a first current signal that is a scaled copy of a peak value of the electric current in the first storage element during the first time interval;
   control the first transistor switch in an open state and the third and fourth transistor switches in a closed state to generate the output signal that supplies the second storage element; and
   maintain the first transistor switch in the open state and the third and fourth transistor switches in the closed state as long as the current of the output signal is higher than the first current signal.

2. The energy-scavenging interface according to claim 1, further comprising a first electrical-signal detecting device coupled to conduction terminals of the first transistor switch and second transistor switch and configured to detect, during the first time interval, whether the electric current in the first storage element reaches a threshold value, the control circuit further configured to keep the first and second transistor switches in the closed state and the third transistor switch in an open state until the electric charge stored in the first storage element reaches the first threshold value.

3. An energy-scavenging interface comprising:
   a first input terminal coupled to a first storage element and configured to receive an electrical input signal;
   a second input terminal;

a first output terminal coupled to a second storage element and configured to supply an output signal;
a second output terminal;
a first switch and a second switch connected in series between the first input terminal and the second output terminal;
a third switch and a fourth switch connected in series between the first input terminal and the first output terminal;
a control circuit configured to:
   control the first and second switches in a closed state and the third switch in an open state for a first time interval having at least one first time duration during which the first storage element stores electric charge;
   acquire a scaled copy of a peak value of the electric current stored in the storage element during the first time interval;
   control the first switch in an open state and the third and fourth switches in a closed state to generate the output signal that supplies the second storage element; and
   maintain the first switch in the open state and the third and fourth switches in the closed state as long as the current value of the output signal is higher than the value of said scaled copy of the peak value; and
a sampling capacitor electrically coupled between a conduction terminal of the second switch and the second output terminal for acquiring and storing an electrical signal indicating said peak value; and
a first current-scaling switch maintained in the closed state together with the second switch and configured to carry an electric current having a value that is reduced, with respect to the peak value, by a first scaling factor.

4. The energy-scavenging interface according to claim 3, wherein the first and third switches are high-voltage transistors, and the second and fourth switches are low-voltage transistors.

5. The energy-scavenging interface according to claim 4, wherein the first current-scaling switch is a low-voltage transistor having a width/length (W/L) shape factor that is reduced, with respect to the W/L shape factor of the second switch, by a value equal to said first scaling factor.

6. The energy-scavenging interface according to claim 1, wherein said first current signal corresponds to the peak value reduced by a scale factor, the first time duration and the scale factor being chosen of a value such as to optimize a matching efficiency to the first and second input terminal.

7. An energy-scavenging interface comprising:
a first input terminal coupled to a first storage element and configured to receive an electrical input signal;
a second input terminal;
a first output terminal coupled to a second storage element and configured to supply an output signal;
a second output terminal;
a first switch and a second switch connected in series between the first input terminal and the second output terminal;
a third switch and a fourth switch connected in series between the first input terminal and the first output terminal;
a control circuit configured to:
   control the first and second switches in a closed state and the third switch in an open state for a first time interval having at least one first time duration during which the first storage element stores electric charge;
   acquire a scaled copy of a peak value of the electric current stored in the storage element during the first time interval;
   control the first switch in an open state and the third and fourth switches in a closed state to generate the output signal that supplies the second storage element; and
   maintain the first switch in the open state and the third and fourth switches in the closed state as long as the current value of the output signal is higher than the value of said scaled copy of the peak value;
a first electrical-signal detecting device coupled to conduction terminals of the first transistor switch and second transistor switch and configured to detect, during the first time interval, whether the electric current in the storage element reaches a first threshold value, the control circuit further configured to keep the first and second transistor switches in the closed state and the third transistor switch in an open state until the electric charge stored in the storage element reaches the first threshold value; and
a second electrical-signal detecting device coupled to the conduction terminals of the fourth switch and configured to:
   acquire a value in current of the output signal that flows through the fourth switch; and
   detect when the value in current of the output signal assumes a value equal to said scaled copy of the peak value, the second electrical-signal detecting device further including:
      a second current-scaling switch kept in the closed state together with the fourth switch and configured to carry an electric current having a value that is reduced, with respect to the value in current of the output signal, by a second scaling factor; and
      a comparator configured to receive a signal indicating the output signal and a signal indicating the electric current carried by the second current-scaling switch, and supply a comparison signal indicating a result of the comparison, the second current-scaling switch being traversed, during the second time interval, by an electric current having a value equal to the peak value reduced by the first scaling factor, said comparison signal having a logic value identifying the fact that the output signal assumes a value reduced by a scale factor, where the scale factor is given by the ratio between the first scaling factor and the second scaling factor.

8. The energy-scavenging interface according to claim 7, wherein the second current-scaling switch is a low-voltage transistor having width/length (W/L) shape factor that is reduced, with respect to the W/L shape factor of the fourth switch, by a value equal to said second scaling factor.

9. The energy-scavenging interface according to claim 1, wherein the first and second input terminals are configured to be coupled to a transducer of an electromagnetic type including an inductor, said first storage element being the inductor of said transducer.

10. The energy-scavenging interface according to claim 6, wherein the control circuit is further configured to:
define said matching efficiency as a function of the first time duration and of the scale factor;
acquire a plurality of values of matching efficiency associated to a respective plurality of values of said first time duration and to a respective plurality of values of the scale factor; and identify a value of said first time duration and a value of the scale factor such as to optimize the matching efficiency at the first and second input terminals.

11. The energy-scavenging interface according to claim 1, wherein said first time duration is comprised between approximately 1 µs and 100 µs.

12. The energy-scavenging interface according to claim 6, wherein the scale factor is chosen of a value greater than 1.

13. An energy-scavenging system, comprising:
- a transducer configured to convert energy coming from an energy source external to said system into a transduced electrical signal;
- an electrical-energy-scavenging interface configured to receive the transduced electrical signal and supply an output signal; and
- a storage element coupled to the electrical-energy-scavenging interface to receive the output signal and configured to store electrical energy for supplying an electrical load;
- wherein the electrical-energy-scavenging interface comprises:
  - a first transistor switch and a second transistor switch connected in series between the transducer and a reference node;
  - a third transistor switch and a fourth transistor switch connected in series between the transducer and the storage element;
  - a transistor connected in a current mirror with the second transistor switch, said transistor configured to generate a current signal that is a scaled copy of the current flowing through the first and second transistor switches; and
  - a control circuit configured to:
    - control the first and second transistor switches in a closed state and the third transistor switch in an open state for a first time interval having at least one first time duration during which electric current is stored;
    - generate with said transistor a peak current signal indicative of a peak value of the current flowing through the first and second transistor switches during the first time interval;
    - control the first transistor switch in an open state and the third and fourth transistor switches in a closed state to generate the output signal that supplies the storage element; and
    - maintain the first transistor switch in the open state and the third and fourth transistor switches in the closed state as long as the current of the output signal is higher than a threshold set by the peak current signal.

14. The system according to claim 13, wherein the electrical-energy-scavenging interface comprises a DC-DC converter.

15. The system according to claim 13, wherein the transducer is installed within a vehicle.

16. The system according to claim 13, wherein the transducer is installed within an item of sports footwear.

* * * * *